US008407078B1

(12) United States Patent
Caputo et al.

(10) Patent No.: US 8,407,078 B1
(45) Date of Patent: Mar. 26, 2013

(54) METHOD OF AND SYSTEM FOR MANAGING PROJECTS, PROGRAMS AND PORTFOLIOS THROUGHOUT THE PROJECT LIFECYCLE

(75) Inventors: Michele Caputo, Garland, TX (US); Stevin Smith, Gilbert, AZ (US); Sean Wilson, Plano, TX (US); Chuck Martin, Frisco, TX (US); Edward A. Putonti, Richardson, TX (US); Lisa Pidun, Bloomfield Hills, MI (US); Wendell John Jeske, Waxahachie, TX (US); Mary E. Lee, Santa Cruz, CA (US)

(73) Assignee: Perot Systems Corporation, Plano, TX (US)

( * ) Notice: Subject to any disclaimer, the term of this patent is extended or adjusted under 35 U.S.C. 154(b) by 299 days.

(21) Appl. No.: 12/689,445

(22) Filed: Jan. 19, 2010

Related U.S. Application Data

(60) Provisional application No. 61/145,903, filed on Jan. 20, 2009.

(51) Int. Cl.
*G06Q 10/00* (2006.01)
(52) U.S. Cl. ..................................................... 705/7.27
(58) Field of Classification Search ................. 705/7.23, 705/7.27
See application file for complete search history.

(56) References Cited

U.S. PATENT DOCUMENTS

| | | | |
|---|---|---|---|
| 5,907,490 A | 5/1999 | Oliver | |
| 5,918,207 A | 6/1999 | McGovern et al. | |
| 6,023,702 A * | 2/2000 | Leisten et al. ........................ 1/1 |
| 6,203,812 B1 * | 3/2001 | Ehrhard et al. ................ 424/407 |
| 6,308,164 B1 * | 10/2001 | Nummelin et al. ........... 705/7.23 |
| 7,788,118 B1 * | 8/2010 | Vahee et al. .................. 705/7.23 |
| 7,890,924 B2 * | 2/2011 | Raffo ............................. 717/105 |
| 2002/0052773 A1 | 5/2002 | Kraemer et al. |
| 2002/0077877 A1 | 6/2002 | Oliver |
| 2002/0082889 A1 | 6/2002 | Oliver |
| 2002/0107914 A1 | 8/2002 | Charisius et al. |
| 2003/0083912 A1 | 5/2003 | Covington, III et al. |
| 2003/0093472 A1 | 5/2003 | Warren |
| 2003/0135399 A1 | 7/2003 | Ahamparam et al. |
| 2003/0135481 A1 | 7/2003 | Helmes et al. |
| 2003/0182173 A1 | 9/2003 | D'Elena et al. |
| 2003/0225748 A1 | 12/2003 | Haeberle |
| 2003/0233267 A1 | 12/2003 | Hertel-Szabadi |
| 2003/0233268 A1 | 12/2003 | Taqbeem et al. |
| 2003/0236692 A1 | 12/2003 | Hertel-Szabadi |
| 2004/0017400 A1 | 1/2004 | Ly et al. |

(Continued)

FOREIGN PATENT DOCUMENTS

WO WO-03/050656 6/2003

OTHER PUBLICATIONS

Bystrom (Information and Information Sources in Tasks in Varying Complexity), Dec. 2002, Journal of the American Society for Information Science and Technology, p. 581-591.*

(Continued)

*Primary Examiner* — Romain Jeanty
(74) *Attorney, Agent, or Firm* — Winstead PC

(57) ABSTRACT

In one embodiment, a project-management method includes implementing, on a server computer having a processor and memory, a universal framework for engaging projects within an enterprise. The project-management method further includes optimizing, via the server computer, at least one project via an integration of a standardized set of process-related project-management assets, a standardized set of project-management assets related to at least one of selecting, assigning, developing, certifying, and managing human resources involved in project management, and a standardized set of project-management assets comprising a plurality of technological tools.

40 Claims, 27 Drawing Sheets

U.S. PATENT DOCUMENTS

| | | |
|---|---|---|
| 2004/0073479 A1 | 4/2004 | Walsh |
| 2004/0098300 A1 | 5/2004 | Karwatowski et al. |
| 2004/0111306 A1 | 6/2004 | Yokota et al. |
| 2004/0111351 A1 | 6/2004 | Ikeda et al. |
| 2004/0148566 A1 | 7/2004 | Jaffar et al. |
| 2004/0153354 A1 | 8/2004 | Nonaka et al. |
| 2005/0144592 A1 | 6/2005 | Below et al. |
| 2006/0015519 A1 | 1/2006 | LaBrosse |

OTHER PUBLICATIONS

"IT Organization and Governance", Center for Information Management and Studies (CIMS) at Babson College, Feb. 2006.

"Board Briefing on IT Governance, 2ed", IT Governance Institute, 2003.

"IT Governance Framework", Craig Symons, Forrester Research, Inc., Mar. 2005.

"Don't Just Lead—Govern: Implementing Effective IT Governance", Weill and Woodham, MIT, Sloan School of Management, Center for Information System Research, 2002.

"It Governance on One Page", Weill and Ross, MIT, Sloan School of Management, Center for Information System Research, 2004; MIT Sloan School Center for Information Systems Research (CISR), 2003.

"IT Infrastructure for Strategic Agility", Weill, Subramani, Broadbent, working paper, MIT CISR 2002.

"Translating Corporate Strategy into Project Strategy—Realizing Corporate Strategy through Project Management", Morris and Jamieson, Project Management Institute, Inc, 2004.

"Advanced Project Portfolio Management and the PMO—Multiplying ROI at Warp Speed", Kendall and Rollins, 2003.

"IT Governance—How Top Performers Manage IT Decision Rights for Superior Results", Weill and Ross, 2004.

"Strategies for Information Technology Governance", Wim Van Grembergen, 2004.

"The Standard for Portfolio Management", PMI Global Standard, Project Management Institute, Inc, 2006.

"Project Management Body of Knowledge Third Edition", Project Management Institute, Inc, 2004.

Carbone, Thomas A; Gholston, Sampson; Project Manager Skill Development: A Survey of Programs and Practitioners Carbone, Engineering Management Journal v16n3 pp. 10-16 Sep. 2004. Dialog File: 15.

U.S. Appl. No. 11/010,500, Putonti et al.

* cited by examiner

1702

PMQP Site
Project Status List: New Item

💾 Save and Close | Go Back to List

Project Name * | Account Start Up Management
Links the status report to the project in the inventory.

Project Manager * | last, first
Identifies the project manager as of the status date.

Status Date * | 1/15/2008 📅
The as of date for the status report.

PM Cert GAP | ☐
Indicates whether there is a GAP between the certification level of the PM and the project level. L4 projects require a performer or higher, L5 require a master or higher. Supports PMQP Maturity Metric 4.1

Overall Status * | Green ▼
Indicates the overall status of the project Green - no significant issues or challenges, Yellow - significant issues exist and plans to address them have been identified, Red - significant issues exist, but action plans not yet identified.

Primary Cause R/Y | ▼
Categorizes the primary cause for the Red/Yellow status projects. Supports PMQP Maturity Metric 4.4

Primary Cause Description | [rich text editor]
Describes the nature of the issue causing the Yellow/Red status overall.

Financials Status * | Green ▼
Indicates the status with respect to the financial aspects of the project.

Schedule Status * | Green ▼
Indicates the status with respect to the schedule.

Issues Status * | Green ▼
Indicates the status with respect to issues.

Resource Status * | Green ▼
Indicates the status with respect to the resources staffing the project.

Scope Status * | Green ▼
Indicates the overall status with respect to the scope of work of the project.

Secondary Cause R/Y * | ▼
Identifies the secondary cause for Yellow/Red status allowing categorization. Supports PMQP Maturity Metric 4.4

Secondary Cause Description | [rich text editor]
Description of the nature of the secondary cause for R/Y status.

R/Y Action Plan | [rich text editor]
Summarize your action plan for getting back to a GREEN status. Keep in mind the consumer of this information is senior management.

FIG. 17

| KNOWLEDGE AREA/ PMM LIFECYCLE PHASE | FEASIBILITY | INITIATION | PLANNING | EXECUTION | SHUTDOWN |
|---|---|---|---|---|---|
| 01 GOVERNANCE MANAGEMENT | MONITORING, OVERSIGHT, STANDARD METRICS, REPORTING, INTERVENTION TRIGGERS AND REMEDIATION FOR UNDERPERFORMING PROJECTS | | | | |
| 02 PROJECT PORTFOLIO MANAGEMENT | | 02.1 CREATING AND MANAGING THE PROJECT INVENTORY AND NEW PROJECT REQUEST | 02.2 PRIORITIZING PROJECTS FOR EXECUTION; 02.3 DEVELOPING AND MAINTAINING RESOURCE CAPACITY, PLAN AND FORECAST | 02.4 ON-GOING MANAGEMENT, ANALYSIS AND REPORTING ON THE PROJECT PORTFOLIOS 02.5 MANAGE PROJECT CHANGES | |
| 03 PROJECT INTEGRATION MANAGEMENT | 03.1 DEVELOP PROJECT CHARTER | 03.2 DEVELOP BUSINESS REQUIREMENTS | 03.3 DEVELOP PROJECT PLAN DOCUMENT | 03.4 DIRECT AND MANAGE PROJECT EXECUTION; 03.5 MONITOR AND CONTROL PROJECT WORK; 03.6 INTEGRATED CHANGE CONTROL | 03.7 CLOSE PROJECT |
| 04 PROJECT SCOPE MANAGEMENT | | | 04.1 SCOPE PLANNING; 04.2 SCOPE DEFINITION | 04.3 SCOPE VERIFICATION 04.4 SCOPE CONTROL | |
| 05 PROJECT TIME MANAGEMENT | | | 05.1 ACTIVITY DEFINITION; 05.2 ACTIVITY SEQUENCING; 05.3 ACTIVITY ESTIMATING; 05.4 ACTIVITY RESOURCE ESTIMATING 05.5 SCHEDULE DEVELOPMENT | 05.6 SCHEDULE CONTROL | |
| 06 PROJECT COST MANAGEMENT | | 06.1 PROJECT COST ESTIMATING AND BUDGETING | 06.1 PROJECT COST ESTIMATING AND BUDGETING | 06.2 PROJECT COST CONTROL | |
| 07 PROJECT QUALITY MANAGEMENT | | | 07.1 QUALITY PLANNING | 07.2 PERFORM QUALITY ASSURANCE 07.3 PERFORM QUALITY CONTROL | |
| 08 PROJECT HR MANAGEMENT & PMO ORGANIZATION | | | 08.2 HUMAN RESOURCE PLANNING; 08.3 ACQUIRE PROJECT TEAM 08.1 PMO ORGANIZATION PLANNING; 08.2 ACQUIRE PMO STAFF | 08.04 DEVELOP PROJECT TEAM; 08.05 MANAGE PROJECT TEAM 08.3 PMO TEAM DEVELOPMENT; 08.4 PMO TEAM MANAGEMENT | |
| 09 PROJECT COMMUNICATIONS MANAGEMENT | 09.4 STAKEHOLDER MANAGEMENT | 09.4 STAKEHOLDER MANAGEMENT | 09.1 COMMUNICATIONS PLANNING; 09.4 STAKEHOLDER MANAGEMENT | 09.1 COMMUNICATIONS PLANNING; 09.2 INFORMATION DISTRIBUTION; 09.3 PERFORMANCE REPORTING; 09.4 STAKEHOLDER MANAGEMENT | 09.2 INFORMATION DISTRIBUTION; 09.4 STAKEHOLDER MANAGEMENT |
| 10 PROJECT RAIDO MANAGEMENT | | 10.1 RAIDO MANAGEMENT PLANNING 10.2 RISK, ASSUMPTIONS, ISSUES, DEFINITIONS AND OUT-OF SCOPE IDENTIFICATION | 10.1 RAIDO MANAGEMENT PLANNING 10.2 RISK, ASSUMPTIONS, ISSUES, DEFINITIONS AND OUT-OF-SCOPE IDENTIFICATION 10.3 QUALITATIVE RISK ANALYSIS 10.4 QUANTITATIVE RISK ANALYSIS 10.5 RISK RESPONSE PLANNING | 10.6 RAIDO MONITORING AND CONTROL | |
| 11 PROJECT PROCUREMENT MANAGEMENT | | | 11.1 PLAN PURCHASES AND ACQUISITIONS; 11.2 PLAN CONTRACTING; 11.3 REQUEST SUPPLIER RESPONSES; 11.4 SELECT SUPPLIERS | 11.5 PROCUREMENT ADMINISTRATION | 11.6 PROCUREMENT CLOSURE |

FIG. 20

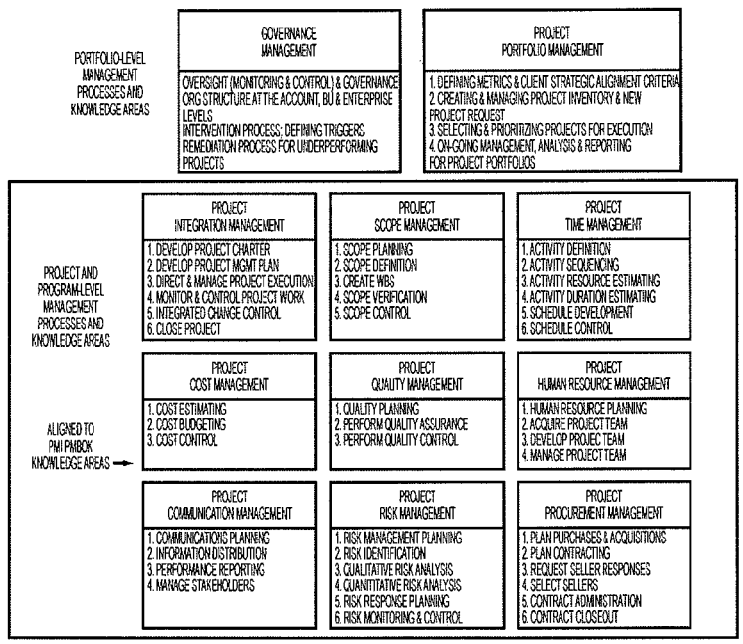

Project, Program and Portfolio Management Methodology (P³MM)
*The Perot Systems Global Project Delivery Framework*

Navigate the P³MM processes, tools and templates by utilizing the navigational table below.

Click on a specific Project Phase or Knowledge Area in the Red tab below to obtain the assets specific to a Project Phase or Knowledge Area or link directly to the SOP document by selecting the Activity name within the Red tab.

Alternatively, access assets by Project Phase from the Blue tab or by Topic (Scope Management SOP, RAIDO Management, Planning, PMQP, etc.) from the Green tab.

You may also open the All P³MM Assets page from the Yellow tab to view assets alphabetically and obtain last modified date and version history information.

2515 → Knowledge Area by Project Phase
2517 → Activities by Project Phase
2519 → Assets by Topic
2521 → All Assets Alpha Listing Page

| SOPs | Assets by Knowledge Area | Assets by Project Phase | Assets by Topic |
|---|---|---|---|
| Governance | Governance | Overview | What's New |
| Portfolio Governance | Portfolio Management | Feasibility | P³MM |
| Portfolio Management | Integration Management | Initiation | Project Management Quality Program (PMQP) |
| Integration Management | Scope Management | Planning | Project Management Information System (PMIS) |
| Scope Management | Time Management | Execution | IT Governance/ Maturity Assessment |
| Time Management | Cost Management | Shutdown | Project Management Learnin System (PMLS) |
| Cost Management | Quality Management | | P³MM Performance Metrics |
| Quality Management | HR Management | Sales | |
| HR Management | PMO Organization | Operations | |
| PMO Organization | Communications Management | | |
| Communications Management | RAIDO Management | | |
| RAIDO Management | Procurement Management | | |
| Procurement Management | | | PMM & PMQP Zip File* |
| SOP Zip File* | | | Workshop Slides Zip File* |

*Zip file is not currently being updated due to numerous P³MM process updates Please obtain individual files you need. The zip files will be updated in January.

FIG. 26 — 2600

Web Part Page - Microsoft Internet Explorer

File  Edit  View  Favorites  Tools  Help

Home   Site Content   Help   TRAIN Home                                    Methodologies — 2521

You may sort by "Name" or "Modified" date and view Version History via the Edit menu on each asset.

All P³MM Assets                                                     Modify Shared Page ▼

New Document | Upload Document | New Folder | Filter |

| Type | Name | Artifact Title | Modified |
|---|---|---|---|
| | $ 2008 Whats New in P3MM | $ What's New in this Release 1 of the P3MM methodology for 2008 | 4/9/2008 10:56 AM |
| | MS Project-Project Server Tool Note | MS Project-Project Server Tool Note | 6/25/2008 4:08 PM |
| | OCM | Organizational Change Management Methodology Library | 8/6/2008 11:03 AM |
| | OTTR | Online Time Tracking & Reporting (OTTR) | 9/23/2008 9:02 AM |
| | P3MM00_Processes_v1.3 | P3MM00 Processes v1.3 | 7/30/2008 12:10 PM |
| | P3MM00-030 PMM-SOP-PMQP Overview Slides | PMM, PMQP, GPDP & SOPs Explained | 5/6/2008 11:01 PM |
| | P3MM00-030 P3MM Metrics Slides | P3MM00-030_P3MM Project Performance Metrics | 11/24/2008 1:42 PM |
| | P3MM00-030_PMM Manual | P3MM00-030_PMM Manual | 7/30/2008 12:23 PM |
| | P3MM00-050_Glossary | P3MM00-050 Project Management Glossary | 1/5/2009 3:38 PM |
| | P3MM00-PMQP Templates v1.2 | P3MM00-PMQP Templates v1.2 | 7/30/2008 12:11 PM |
| | P3MM01-010 Process Waiver Form | P3MM01-010 Process Waiver Form | 1/22/2008 4:49 PM |
| | P3MM01-020 Enterprise Governance | P3MM01-020 Enterprise Governance process and standards | 2/5/2008 6:04 PM |
| | P3MM02a-010_PortfolioGovernanceSOP | P3MM02a-010 Portfolio Governance SOP | 1/28/2008 4:05 PM |
| | P3MM02a-011_StrategicDriversTemplate | P3MM02a-011 Strategic Drivers | 2/6/2008 3:29 PM |
| | P3MM02a-020 Foundational Concepts_IT Gorvernance | P3MM02a-020 Foundational Concepts_ IT Governance | 7/30/2008 12:14 PM |
| | P3MM02b-010_PortfolioManagementSOP | P3MM02b-010 Portfolio Management SOP | 2/6/2008 9:07 AM |
| | P3MM02b-011_BusinessCaseTemplate | P3MM02b-011 Project Business Case | 1/18/2008 9:46 AM |
| | P3MM02b-012_CapacityManagementTemplate | P3MM02b-012 Capacity Management Worksheet | 2/6/2008 3:28 PM |
| | P3MM02b-013_NewProjectRequestTemplate | P3MM02b-013 New Project Request Form | 11/24/2008 1:47 PM |
| | P3MM02b-014_ProjectInventoryTemplate | P3MM02b-014 Project Inventory | 2/6/2008 3:29 PM |
| | P3MM02b-020_FeasibilityStudy | P3MM02b-020 Feasibility Study | 1/23/2008 2:37 PM |
| | P3MM02b-030_PIWTaskOrderTemplate | P3MM02b-030 PIW Task Order | 1/18/2008 10:42 AM |
| | P3MM02b-040_PPWTaskOrderTemplate | P3MM02b-040 PPW Task Order | 1/31/2008 1:26 PM |
| | P3MM03 Workshop Slides v1.2 | P3MM03 Workshop Slides v1.2 | 7/30/2008 12:11 PM |
| | P3MM03-010_IntegrationManagementSOP | P3MM03-010 Project Integration Management SOP | 9/25/2008 12:44 PM |

2700

2521

| Knowledge Area by Project Phase | Activities by Project Phase |
|---|---|

| Sales | | Operations |
|---|---|---|
| Portfolio - Level | Governance Management | Monitoring, Oversight, Standard Metrics, Reporting, Intervention Triggers and Remediation for Underperforming Projects |
| | Portfolio Governance | Development of Strategic Drivers<br>Development of Governance Model & Metrics<br>Execution & Improvement of Governance Model |
| | Portfolio Management | Creating and Managing the Project Inventory and New Project Request<br>Prioritizing Projects for Execution<br>Developing and Maintaining Resource Capacity, Plan and Forecast<br>On-going Management, Analysis and Reporting on the Project Portfolios<br>Manage Project Changes |

Knowledge Area by Project Phase

| Project Phase →<br>Knowledge Area ↓ | | Feasibility | Initiation | Planning | Execution | Shutdown |
|---|---|---|---|---|---|---|
| Project - Level | Integration Management | Develop Project Charter | Develop Business Requirements | Develop Project Plan Document | Direct and Manage Project Execution<br>Monitor and Control Project Work<br>Integrated Change Control | Close Project |
| | Scope Management | | | Scope Planning | Scope Definition | Scope Verification<br>Scope Control | |
| | Time Management | | | | Activity Definition<br>Activity Sequencing<br>Activity Estimating<br>Activity Resource Estimating<br>Schedule Development | Schedule Control | |
| | Cost Management | | | | Project Cost Estimating and Budgeting | Project Cost Control | |
| | Quality Management | | | | Quality Planning | Perform Quality Assurance<br>Perform Quality Control | Perform Quality Control |
| | HR Management | | | | Human Resource Planning<br>Acquire Project Team | Develop Project Team<br>Manage Project Team | |
| | PMO Organization | | | | PMO Organization Planning<br>Acquire PMO Staff | PMO Team Development<br>PMO Team Management | |
| | Communications Management | | Stakeholder Management | Stakeholder Management | Communications Planning<br>Stakeholder Management | Communications Planning<br>Information Distribution<br>Performance Reporting<br>Stakeholder Management | Information Distribution<br>Stakeholder Management |
| | RAIDO Management | | | Identify RAIDO<br>RAIDO Management Planning | RAIDO Management Planning<br>Qualitative Risk Analysis<br>Quantitative Risk Analysis<br>Risk Response Planning | RAIDO Monitoring and Control | |
| | Procurement Management | | | | Plan Purchases and Acquisitions<br>Plan Contracting<br>Request Supplier Responses<br>Select Suppliers | Procurement Administration | Procurement Closure |

```
Web Part Page - Microsoft Internet Explorer
File  Edit  View  Favorites  Tools  Help
```

Home  Site Content  Help  TRAIN Home                                                                Methodologies Project, Program and Portfolio Management Methodology (P3MM)
Time Management                                                                                  Modify Shared Page ▼

Use the menu at left to select the desired knowledge Area or Project Phase. To further refine your selection of assets, you may select the appropriate Project Level Categorization value from the checklist.

2811

| Select Project Level ▼ | Time Management Asset Repository ▼ | | | |
|---|---|---|---|---|
| PMQP Project Level | Type Name | Project Level | | Maturity PMO Model |
| ○ Level 1 | ⊟ Asset Type : 01. Overview (3) | | | |
| ○ Level 2 | $ 2008 Whats New in P3MM | Level 1; Level 2; Level 3; Level 4; Level 5; Sales; Operations | High | P1MO; P2MO; P3MO |
| ○ Level 3 | P3MM00-030 PMM-SOP-PMQP Overview Slides | Level 1; Level 2; Level 3; Level 4; Level 5; Sales | High | P1MO; P2MO; P3MO |
| ○ Level 4 | P3MM00-030_PMM Manual | Level 1; Level 2; Level 3; Level 4; Level 5; Sales; Operations | High | P1MO; P2MO; P3MO |
| ○ Level 5 | | | | |
| All Assets by Knowledge Area ▼ | ⊟ Asset Type : 03. Process (4) | | | |
| Name | P3MM00_Processes_v1.3 | Level 1; Level 2; Level 3; Level 4; Level 5; Sales; Operations | High | P1MO; P2MO; P3MO |
| 01 Governance | P3MM03-010_IntegrationManagementSOP | Level 1; Level 2; Level 3; Level 4; Level 5 | High | P1MO; P2MO; P3MO |
| 02 Portfolio Management | P3MM05-010_TimeManagementSOP | Level 1; Level 2; Level 3; Level 4; Level 5; Sales | High | P1MO; P2MO; P3MO |
| 03 Integration Management | PMQP03-4 Project Schedule Quality Verification | Level 2; Level 3; Level 4; Level 5 | High | P1MO; P2MO; P3MO |
| 04 Scope Management | | | | |
| 05 Time Management | | | | |
| 06 Cost Management | | | | |
| 07 Quality Management | ⊟ Asset Type : 05. Templates/Tools (18) | | | |
| 08 Human Resource Management | OTTR | Operations | Medium | P1MO; P2MO; P3MO |
| 08 PMO Organization | P3MM00-PMQP Templates v1.2 | Level 1; Level 2; Level 3; Level 4; Level 5; Sales; Operations | High | P1MO; P2MO; P3MO |
| 09 Communications Management | | | | |
| 10 RAIDO Management | P3MM01-010 Process Waiver Form | | Medium | P1MO; P2MO; P3MO |
| 11 Procurement Management | | | | |
| | P3MM03 Workshop Slides v1.2 | Level 1; Level 2; Level 3; Level 4; Level 5 | High | P1MO; P2MO; P3MO |
| All Assets by Project Phase ▼ | P3MM03-015_PPD | Level 1; Level 2; Level 3; Level 4; Level 5 | High | P1MO; P2MO; P3MO |
| Name | P3MM03-016_PPD Appendix | Level 1; Level 2; Level 3; Level 4; Level 5 | High | P1MO; P2MO; P3MO |
| 01 Overview | | | | |
| 02 Feasibility | P3MM03-160_ChangeRequest | Level 1; Level 2; Level 3; Level 4; Level 5 | High | P1MO; P2MO; P3MO |
| 03 Initiation | | | | |
| 04 Planning | P3MM05-020_Project Schedule Template | Level 1; Level 2; Level 3; Level 5; Sales | Medium | P1MO; P2MO; P3MO |
| 05 Execution | P3MM05-030 Give Get LIST | Level 1; Level 2; Level 3; Level 4; Level 5 | High | P1MO; P2MO; P3MO |
| 06 Shutdown | | | | |
| Client Lifecycle ▼ | P3MM09-040_StatusReportPlanningPhase | | High | P1MO; P2MO; P3MO |
| Name | P3MM09-040_StatusReportTemplate | Level 1; Level 2; Level 3; Level 4; Level 5 | High | P1MO; P2MO; P3MO |
| Operations | | | | |
| Sales | P3MM09-040_StatusReportTemplateWorkPackage | Level 1; Level 2 | Medium | P1MO; P2MO; P3MO |
| ⊟ Add new document | | | | |
| | P3MM09-090_StatusReportExecutionPhase | Level 1; Level 2; Level 3; Level 4; Level 5 | High | P1MO; P2MO; P3MO |
| | PMQP Templates v1.0 | Level 1; Level 2; Level 3; Level 4; Level 5 | High | P1MO; P2MO; P3MO |
| | PMQP05-02_P3MM Project Workbook | Level 1; Level 2; Level 3; Level 4; Level 5 | Medium | P3MO |
| | PMQP05-03-Project Audit Workbook | | High | P1MO; P2MO; P3MO |
| | ProjectReporter | Level 1; Level 2; Level 3; Level 4; Level 5; Sales; Operations | High | P1MO; P2MO; P3MO |
| | Schedule Scoring Tool | Level 1; Level 2; Level 3; Level 4; Level 5; Sales | Medium | P1MO; P2MO; P3MO |
| | ⊟ Asset Type : 08. Training (1) | | | |
| | PMLS | Level 1; Level 2; Level 3; Level 4; Level 5; Operations | Medium | P1MO; P2MO; P3MO |
| | ⊟ Asset Type : 11. Glossary (1) | | | |
| | P3MM00-050_Glossary | Level 1; Level 2; Level 3; Level 4; Level 5; Sales; Operations | Medium | P1MO; P2MO; P3MO |

METHOD OF AND SYSTEM FOR MANAGING PROJECTS, PROGRAMS AND PORTFOLIOS THROUGHOUT THE PROJECT LIFECYCLE

CROSS-REFERENCE TO RELATED APPLICATIONS

This application claims priority from and incorporates by reference the entire disclosure of U.S. Provisional Application No. 61/145,903, filed on Jan. 20, 2009. This application is related to and incorporates by reference the entire disclosure of U.S. patent application Ser. No. 11/010,500, filed on Dec. 13, 2004.

BACKGROUND

1. Technical Field

The present invention relates generally to improved project management and more particularly, but not by way of limitation, to a method of and system for managing projects in an efficient and effective manner.

2. History of Related Art

Customers demand projects that are, inter alia, on time, within budget, and according to specification. Organizations that consistently produce such results earn customer satisfaction and repeat business. Nevertheless, particularly in the realm of information technology (IT), organizations routinely fail to meet customer demands.

One way to facilitate quality is to address individuals that work on projects such as, for example, a project manager. It is beneficial to ensure that the project manager is trained and prepared to manage a project. However, training is often task-specific and difficult to manage at a project level. Management within an organization may desire to select a project manager that is competent for the job but lack any knowledge of what is necessary to be competent and what is necessary to develop the competence.

Another way to facilitate quality is to utilize technology such as, for example, various commercial-off-the-shelf (COTS) technologies that help manage, for example, project time and project cost and help automate various project-management activities. However, organizations typically use the COTS technologies in an ad hoc manner. It is generally left to the project manager or other project-management personnel on a project to select among various available COTS technologies to perform various tasks. Therefore, there is no way of knowing which technologies may be best suited for a particular task.

Yet another way to facilitate quality is to turn to standards and processes established by project-management standards organizations such as, for example, the Project Management Institute (PMI). Although project-management standards and processes are beneficial, there is no way to make certain that the project-management standards and processes are followed. Non-compliance is frequently recognized at a point when compliance is no longer possible and, moreover, success of the project is jeopardized. Additionally, projects and customers vary extensively. Hence, implementation of project-management standards and processes is generally ineffective.

SUMMARY OF THE INVENTION

In one embodiment, a project-management method includes implementing, on a server computer having a processor and memory, a universal framework for engaging projects within an enterprise. The implementation includes specifying, in one or more computer-readable media accessible to the server computer, a project-management process operable to manage projects within the enterprise. The project-management process comprises a plurality of phases. Each phase of the plurality of phases comprises a plurality of standard operating procedure (SOP) activities to be performed from at least one project-management level. The project-management process also includes, on the one or more computer-readable media, storing and integrating into the project-management process a standardized set of process-related project-management assets, a standardized set of project-management assets related to at least one of selecting, assigning, developing, certifying, and managing human resources involved in project management, and a standardized set of project-management assets comprising a plurality of technological tools. Each project-management asset of the standardized set of process-related project-management assets being identified with at least one SOP activity of the project-management process, the standardized set of project-management assets in combination with the project-management process being deemed to increase at least one of project quality, project efficiency, and project effectiveness. The standardized set of project-management assets comprising a plurality of technological tools are operable to automate one or more aspects of the project management process. The project-management method further includes optimizing, via the server computer, at least one project via the integration of the standardized set of process-related project-management assets, the standardized set of project-management assets related to at least one of selecting, assigning, developing, certifying, and managing human resources involved in project management, and the standardized set of project-management assets comprising the plurality of technological tools.

In some embodiments, a method includes, on a server with data access to a computer-readable medium, organizing a plurality of project-management assets in the computer-readable medium according to a project management methodology (PMM). The PMM includes a plurality of project phases. The plurality of project phases include a plurality of standard operating procedure (SOP) activities. The organizing action comprises identifying each of the plurality of project-management assets with one or more of the SOP activities. The method further includes arranging the plurality of project-management assets in the computer-readable medium for access from a plurality of project dimensions, the plurality of project dimensions comprising dimensions of the PMM. The plurality of project dimensions includes a knowledge-area dimension, a project-phase dimension, and a management-level dimension. The method additionally includes, on the server, providing an interface for data access to the plurality of project-management assets from the plurality of project dimensions by users.

In one embodiment, a project-management method includes maintaining, on a server computer having a processor and memory, a plurality of project-management assets comprising a human-resource component, a process component, and a technological component. The process component comprises ones of the plurality of project-management assets deemed to increase at least one of project quality, project efficiency, or project effectiveness. The human-resource component includes ones of the plurality of project-management assets deemed to increase at least one of develop and evaluate project-management competency in human resources. The technological component includes ones of the plurality of project-management assets that are operable to automate various aspects of project management across the enterprise. The project-management method further includes receiving information indicative of a complexity of a project and automatically selecting ones of the standardized set of project-management processes from the process-component, the human-resource component, and the technological component based on the complexity of the project.

BRIEF DESCRIPTION OF THE DRAWINGS

A more complete understanding of the method and system of the present invention may be obtained by reference to the following Detailed Description when taken in conjunction with the accompanying Drawings wherein:

FIG. 17 illustrates an exemplary project-management asset for a governance-management knowledge area;

FIGS. 20-23 illustrate exemplary relationships among various knowledge areas, project phases, and project roles that are created via various SOP activities;

FIG. 24 is a listing of exemplary project-management assets;

FIG. 25 illustrates an exemplary display that may be utilized to navigate a knowledge repository;

FIG. 26 illustrates a display of project-management assets;

FIG. 27 illustrates a display of project-management assets;

FIG. 28 illustrates a display of project-management assets;

FIG. 29 illustrates a display of project-management assets;

FIG. 30 illustrates an exemplary interface for displaying relationships for a project-management asset;

FIGS. 31A-C each illustrate an exemplary project-management asset; and

DETAILED DESCRIPTION

Various embodiments of the present invention will now be described more fully with reference to the accompanying drawings. The invention may, however, be embodied in many different forms and should not be construed as limited to the embodiments set forth herein; rather, the embodiments are provided so that this disclosure will be thorough and complete, and will fully convey the scope of the invention to those skilled in the art.

In various embodiments, project-management assets are better stored, accessed, and leveraged by uniting the project-management assets via a data model that is based upon a project management methodology (PMM). According to exemplary embodiments, a project-management asset, as used herein, is a tool or guide that, when properly leveraged, has a known tendency to aid in project-management endeavors. According to exemplary embodiments, a PMM, as used herein, facilitates planning, organization, and management of resources to bring about successful completion of specific project goals and objectives.

Figure 1A:
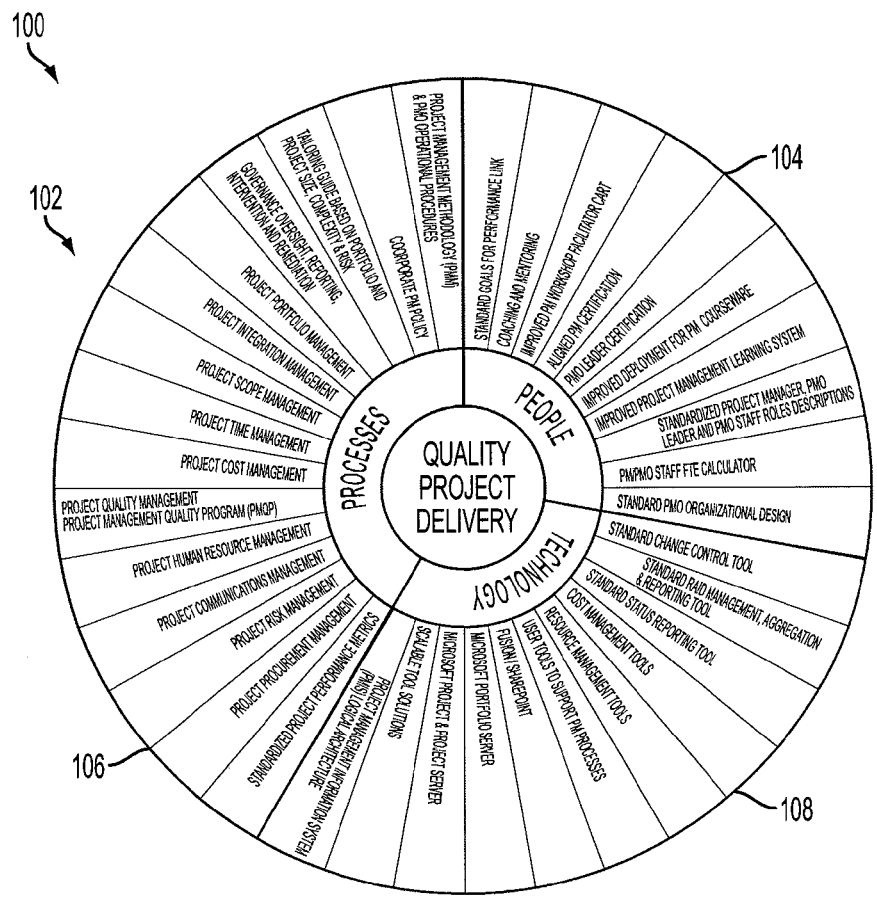
FIG. 1A is a graphical view of project-management assets.

FIG. 1A is a subdivided graphical view 100 of project-management assets 102 that are generally instrumental in delivering quality projects. Although not traditionally organized as such, in a typical embodiment, the project-management assets 102 are divided into three segments, namely: a people segment 104, a process segment 106, and a technology segment 108. In various embodiments, quality project delivery is enhanced by successful selection and application of ones of the project-management assets 102 in all three segments according to the project management methodology (PMM).

In a typical embodiment, the people segment 104 is, at least in part, a recognition that a variety of project-management skills are valuable in ensuring consistency in quality project delivery for customers. For example, one of ordinary skill in the art will recognize that it is advantageous for a project manager to exhibit excellent leadership skills, business acumen, and effective customer development and management. In endeavors towards that end, the people segment 104 may include, for example, a project management learning system (PMLS) that emphasizes training of project managers to improve and develop at least one of leadership skills, business acumen, and effective customer-development and management skills. U.S. patent application Ser. No. 11/010,500, incorporated herein by reference, discusses aspects of various embodiments of the PMLS.

In a typical embodiment, the process segment 106 is concerned with, for example, increasing project efficiency and effectiveness by perfecting when, how, and which project activities are performed. In some embodiments, this perfection involves instituting practices, metrics, and checkpoints that increase likelihood of a quality project delivery. The process segment 106, therefore, includes resources for project personnel regarding, for example, the instituted practices, metrics, and checkpoints. The process segment 106 will be discussed in further detail relative to the ensuing figures.

In a typical embodiment, the technology segment 108 includes at least one of, for example, a compilation of commercial-off-the-shelf (COTS) tools and custom technology operable to improve efficiency and/or quality of project delivery. The technology segment 108 is operable to help project managers manage projects via increased efficiency and automation. The technology segment 108 will also be discussed in further detail relative to the ensuing figures.

Traditionally, project-management assets such as, for example, the project-management assets 102 are neither organized into the segments discussed above nor otherwise adequately organized so as to enable optimization of quality for all projects. According to various embodiments, the project-management assets 102 may be organized in a computer-readable medium according to a universal framework in order to enable project optimization for all projects across one or more organizations.

Figure 1B:
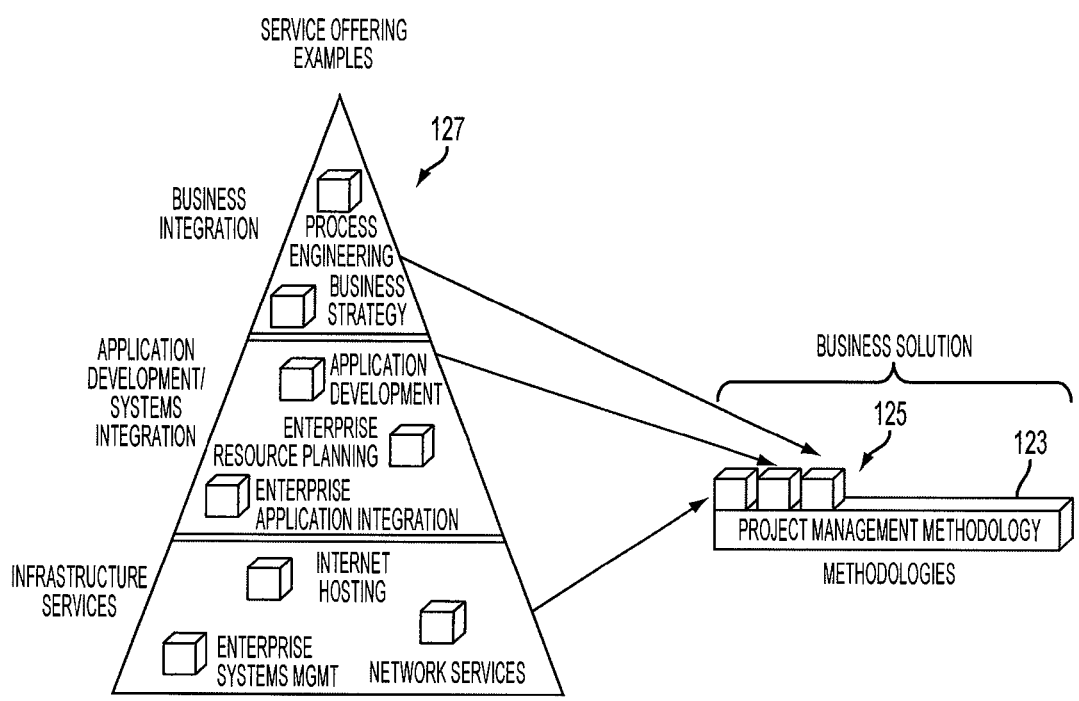
FIG. 1B is a diagram illustrating a project management methodology (PMM)

FIG. 1B is a diagram illustrating a project management methodology (PMM) 123. In a typical embodiment, the PMM 123 is a universal approach for engaging customers and projects, regardless of a product or service being delivered. However, an organization may develop projects that relate to a diverse assortment of product and service offerings 127. In a typical embodiment, diversity among the product and service offerings 127 is handled by a plurality of delivery methodologies 125. In a typical embodiment, a delivery methodology is a common approach for delivering a product or service such as, for example, the plurality of product and service offerings 127. The plurality of delivery methodologies 125 are utilized within the PMM 123. For example, development of a software application or a network solution may utilize one of the plurality of delivery methodologies 125 that is specific to the product or service. In this manner, projects for each of the plurality of product and service offerings 127 may have separate delivery methodologies but still fit within and conform to a more generic framework represented by the PMM 123.

Figure 2:
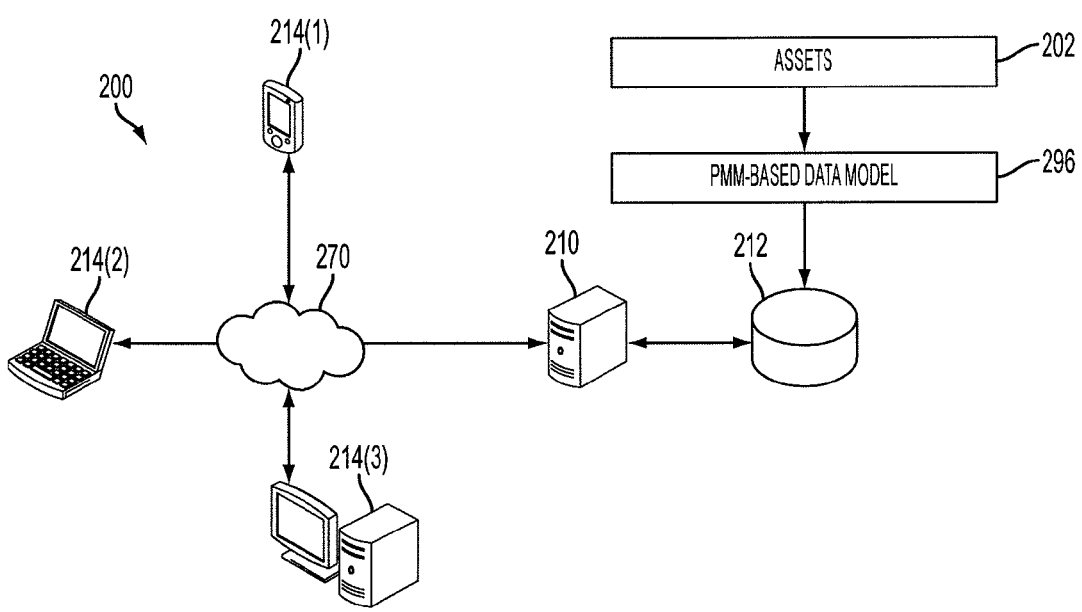
FIG. 2 illustrates an asset-acquisition system.

FIG. 2 illustrates an asset-acquisition system 200 for managing project-management assets 202. In a typical embodiment, the project-management assets 202 may include, for example, the project-management assets 102 of FIG. 1A. The asset-acquisition system 200 includes clients 214(1), 214(2), and 214(3) in communication with a server 210 via, for example, a network 270. In a typical embodiment, the network 270 may be, for example, the Internet. The server 210 has communicably coupled thereto a knowledge repository 212. In a typical embodiment, the knowledge repository 212 may be, for example, a computer-readable storage medium that operates to store the project-management assets 202 according to a PMM-based data model 296.

In a typical embodiment, the server 210 may be a hardware server that has a computer application running thereon. The clients 214(1), 214(2), and 214(3) may be, in various embodiments, smartphones, desktop computers, laptops, personal digital assistants (PDAs), and the like. One of ordinary skill in the art will recognize that the clients 214(1), 214(2), and 214(3) are exemplary in nature and that any number and type of clients may be present. In various embodiments, the network 270 may be, for example, an intranet or the Internet. While an embodiment utilizing the network 270 may be beneficial for using the asset-acquisition system 200 for project management within a particular organization, expanding the network 270 to include multiple networks or even the Internet may allow the asset-acquisition system 200 to be, for example, a web system and to expand its benefits across multiple organizations.

The asset-acquisition system 200 may implement any one of a variety of network architectures. The server 210 may be a hardware server that has a computer application running thereon according to any one of many variations of a client-server architecture. The server 210 may be, for example, a single server. In various embodiments, the server 210 may also represent a plurality of servers operating in a distributed environment. For simplicity, the server 210 is depicted and referenced herein singly. The clients 214(1), 214(2), and 214(3) may have operating thereon a client application such as, for example, a web browser and are operable to send data requests to the server 210 for ones of the project-management assets 202. The server 210 is operable to receive and process the data requests and returns the requested ones of the project-management assets 202 to the requesting one of the clients 214(1), 214(2), and 214(3). In various embodiments, a "thin client" may be used so that a majority of processing activities occurs on the server 210.

In some embodiments, a three-tier client-server architecture may be used. Under the three-tier client-server architecture, a presentation tier, a logical tier, and a data tier may be formed. The presentation tier displays, for example, ones of the project-management assets 202 on the clients 214(1), 214(2), and 214(3) and communicates with the logical tier and the data tier. The logical tier coordinates application processing and, inter alia, performs calculations and processes data. The data tier represents an area where the project-management assets 202 are stored. When any one of the clients 214(1), 214(2), and 214(3) requests, for example, ones of the project-management assets 202, the data tier accesses the requested ones of the project-management assets 202 and passes the requested ones of the project-management assets 202 to the logical tier for processing. The data tier provides the requested ones of the project-management assets 202 to the presentation tier for provision to the requesting one of the clients 214(1), 214(2), and 214(3). In various other embodiments, other network architectures such as peer-to-peer or client-queue-client may also be utilized.

Still referring to FIG. 2, the PMM-based data model 296 implements the PMM. In a typical embodiment, an organization has a project management office (PMO) that defines and maintains the PMM. The PMO may be, for example, a department or group within the organization and may be present at various levels of the organization such as, for example, a project level, a business-unit level, and an enterprise level. The PMM-based data model 296, in a typical embodiment, represents a standardized data model for one or more organizations. In that way, a standardized PMM may be developed that represents a universal engagement approach across all projects and customers and the PMM-based data model 296 implements the standardized PMM. Storing the project-management assets 202 according to the PMM-based data model 296 ensures that an organization implements all best practices and that all tools or guides that have a known tendency to aid in project-management endeavors are made available according to the standardized PMM.

Moreover, in various embodiments, the project-management assets 202 may be more advantageously leveraged by combining, for example, management of the people segment 104, the process segment 106, and the technology segment 108 via the PMM-based data model 296. The PMM-based data model 296, in various embodiments, improves technical performance of the asset-acquisition system 200 by facilitating more timely data access by project personnel to relevant ones of the project-management assets 202. In that way, searching time, for example, of the knowledge repository 212 is minimized. Further in this regard, project processes are similarly made more efficient and quality is safeguarded throughout the project processes. As a result, the likelihood for quality project delivery is increased.

Figure 3:
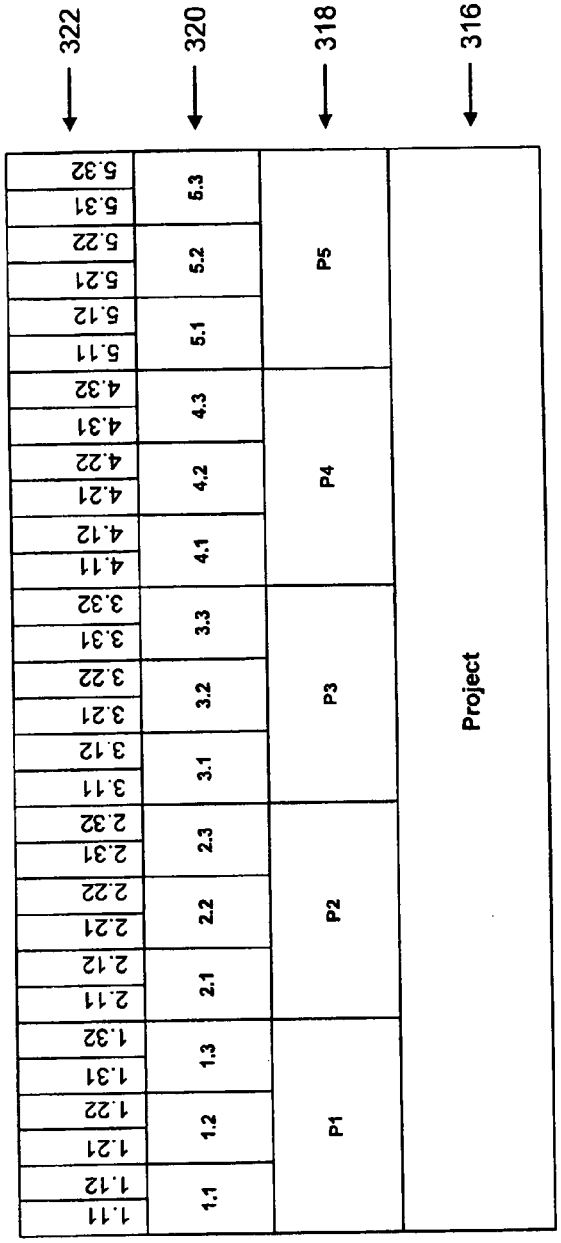
FIG. 3 illustrates a universal framework for organizing project-management assets for a project management methodology (PMM) by project phase.

FIG. 3 illustrates a universal framework 300 for organizing project-management assets for a project management methodology (PMM) by project phase. The universal framework 300 may be, for example, at least one component of the PMM-based data model 296 of FIG. 2. As will be apparent to one of ordinary skill in the art, projects for one or more organizations, particularly very diverse organizations, may vary in scope. However, in various embodiments, it is beneficial to ensure quality project delivery across all projects and customers by developing the universal framework 300 for engaging all projects across the one or more organizations. The universal framework 300 thus provides for uniformity in project management regardless of project type.

As depicted in FIG. 3, a generic project 316 is specified that includes a plurality of standardized project phases 318. The plurality of standardized project phases 318 define a global project lifecycle through which any project subject to a standardized PMM utilizing the universal framework 300 must pass. The plurality of standardized project phases 318 are defined by, for example, standard operating procedure (SOP) activities 320. In a typical embodiment, the SOP activities 320 are mandatory elements of the plurality of standardized project phases 318 that are performed as part of the plurality of standardized project phases 318. In some embodiments, specification of the generic project 316 may end with the specification of the SOP activities 320. In other embodiments, some or all of the SOP activities 320 may be specified into SOP sub-activities 322 that are mandatory elements of the SOP activities 320. It is contemplated that, in some embodiments, additional levels of SOP sub-activities may be specified. As a result of the universal framework 300, it is specified when, that is, in which of the plurality of standardized project phases 318, the SOP activities 320 and the SOP sub-activities 322 occur. In some embodiments, the plurality of standardized project phases 318, the SOP activities 320, and the SOP sub-activities 322 may be specified by a standard-setting organization such as, for example, the Project Management Institute (PMI).

Figure 4:
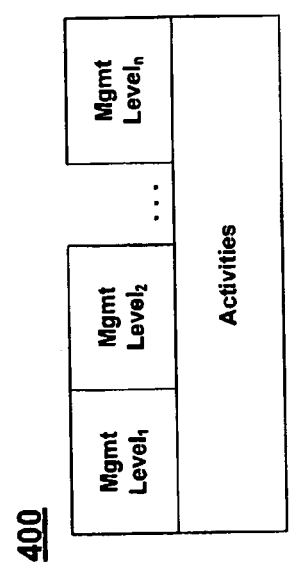
FIG. 4 illustrates a universal framework 400 for organizing project-management assets for a project management methodology (PMM) by management level.

FIG. 4 illustrates a universal framework 400 for organizing project-management assets for a project management methodology (PMM) by management level. A plurality of management levels 424 are utilized to define a management level at which various ones of a plurality of SOP activities 420 occur. For example, if one of the plurality of SOP activities 420 occurs specifically for a project, then the one of the plurality of SOP activities 420 may occur at the project level. The plurality of SOP activities 420 includes all SOP activities such as, for example, the SOP activities 320 and the SOP sub-activities 322 of FIG. 3. The plurality of SOP activities 420, therefore, may represent a hierarchy of SOP activities. In a typical embodiment, each of the plurality of SOP activities 420 is mapped to at least one of the plurality of management levels 424.

Still referring to FIG. 4, the plurality of management levels 424 may include, for example, a project level, a program level, and a portfolio level. A project, as used herein, is a unique process including a set of coordinated and controlled activities with start and finish dates, undertaken to achieve an objective conforming to specific requirements including constraints of, for example, time, cost and resources. A program, as used herein, refers to a group of projects managed in a coordinated way to obtain benefits not available from managing the projects individually. A program may be of indefinite duration. Therefore, a program may contain many projects in varying stages of completion. A portfolio, as used herein, refers to an effective, centralized management (including identifying, prioritizing, authorizing and controlling) of a collection of projects or programs and other work that are grouped together to meet strategic business objectives. The project, program, and portfolio management levels refer to managing a project, program, and portfolio, respectively, as defined above. The project, program, and portfolio management levels are described in further detail below with respect to FIGS. 6A-6F.

Additionally, one of ordinary skill in the art will recognize that each of the plurality of management levels 424 may involve distinct responsibilities. Certain ones of the plurality of SOP activities 420 are typically identified with each of the plurality of management levels 424 in order to ensure quality standards at the plurality of management levels 424. Exemplary ones of the plurality of SOP activities 420 for the plurality of management levels 424 will be discussed in more detail with respect to the ensuing figures.

Figure 5:
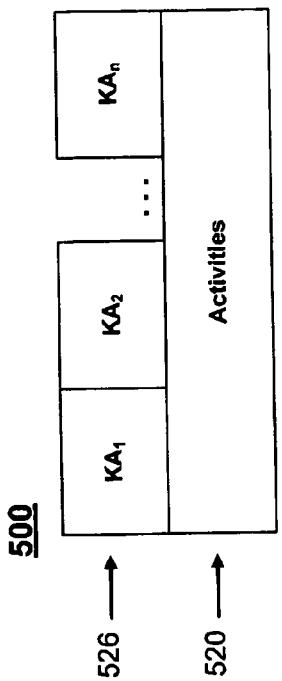
FIG. 5 illustrates a universal framework for organizing project-management assets for a project management methodology (PMM) by knowledge area.

FIG. 5 illustrates a universal framework 500 for organizing project-management assets for a project management methodology (PMM) by knowledge area. In a typical embodiment, SOP activities 520 are generally similar to the plurality of SOP activities 420 of FIG. 4 and are additionally mapped to one or more of a plurality of knowledge areas 526. Each of the plurality of knowledge areas 526 provides a logical or physical compartmentalization of strategically-related ones of the SOP activities 520. For example, ones of the SOP activities 520 relating to project cost may be mapped to a knowledge area of cost management. Through the use of the plurality of knowledge areas 526, strategically-related ones of the SOP activities 520 may be readily identified.

Figure 6A:
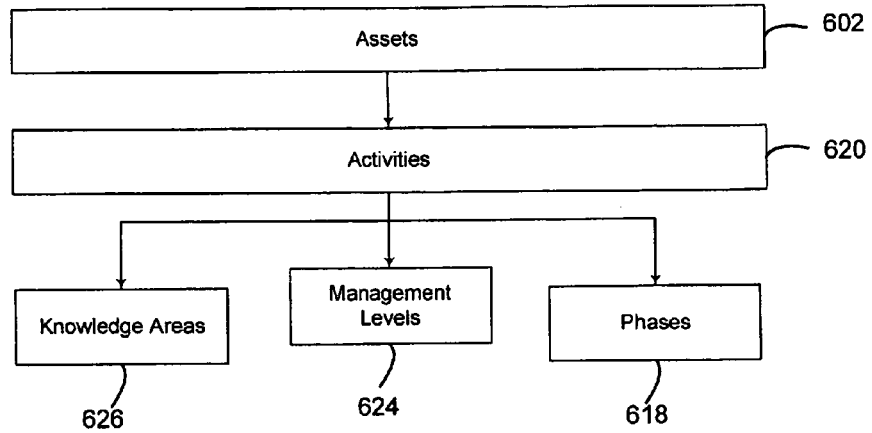
FIG. 6A illustrates a multidimensional PMM-based data model.

FIG. 6A illustrates a multidimensional PMM-based data model 696. A dimension, as used herein, is a dimension of the PMM and is used to describe a vantage point for accessing and/or viewing project-management assets. The multidimensional PMM-based data model 696, in a typical embodiment, facilitates access and viewing of project-management assets 602 from multiple dimensions. In a typical embodiment, the multidimensional PMM-based data model 696 is operable to collectively utilize frameworks similar to the universal framework 300 of FIG. 3, the universal framework 400 of FIG. 4, and the universal framework 500 of FIG. 5 for implementing the standardized PMM. The multidimensional PMM-based data model 696 is operable to organize and enable access to the knowledge repository 212 of FIG. 2 within a computer-readable storage medium.

Within the multidimensional PMM-based data model 696, SOP activities 620 are mapped to a plurality of project phases 618, a plurality of management levels 624, and a plurality of knowledge areas 626 in a manner similar to that discussed above relative to FIGS. 2-5. In a typical embodiment, a particular one of the SOP activities 620 belongs to: (1) at least one of the plurality of knowledge areas 626, the at least one of the plurality of knowledge areas 626 having strategically-related ones of the SOP activities 620; (2) at least one of the plurality of project phases 618, the at least one of the plurality of project phases 618 being phases in which the particular one of the SOP activities 620 occurs; and (3) at least one of the plurality of management levels 624, the at least one of the plurality of management levels 624 being management levels responsible for the particular one of the SOP activities 620.

Additionally, within the multidimensional PMM-based data model 696, the project-management assets 602 may each be assigned to ones of the SOP activities 620. In a typical embodiment, a particular asset in the project-management assets 602 may be assigned to multiple ones of the SOP activities 620. In a typical embodiment, via the assignment to the SOP activities 620, the project-management assets 602 may be accessed in any manner that the SOP activities 620 permit. That is, if the SOP activities 620 are mapped as illustrated in the multidimensional PMM-based data model 696 of FIG. 6A, the project-management assets 602 may be accessed en masse according to a knowledge-area dimension, a project-phase dimension, and a management-level dimension. In that way, as a project, program, or portfolio is being executed, project personnel may quickly and easily access the project-management assets 602 according to the standardized PMM.

Figure 6B:
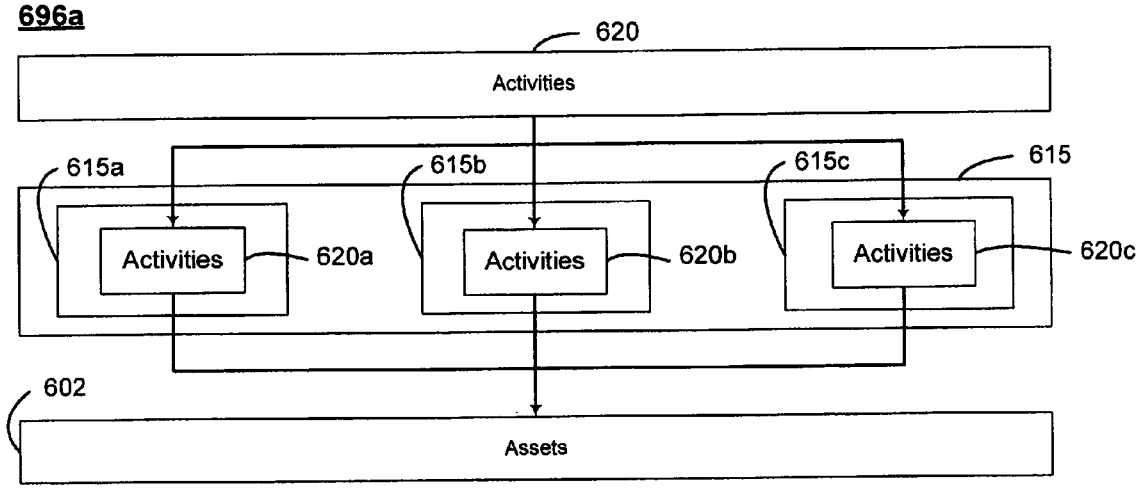
FIG. 6B illustrates a scalability aspect of a scalable data model.

FIG. 6B illustrates a scalability aspect of a scalable data model 696a. In a typical embodiment, the scalable data model 696a is similar to the multidimensional PMM-based data model 696 of FIG. 6A except that ones of the SOP activities 620 may be selected for one or more of a plurality of scaling models 615. In a typical embodiment, the plurality of scaling models 615 may be utilized to allow an organization or business unit to select one of the plurality of scaling models 615 based on, for example, complexity of project-management needs. As shown, the plurality of scaling models 615 may include, for example, a project management office (P1MO) model 615a, a project and program management office (P2MO) model 615b, and a project, program, and portfolio office (P3MO) model 615c. The P1MO model 615a, the P2MO model 615b, and the P3MO model 615c includes SOP activities 620a, 620b, and 620c, respectively, which activities represent ones of the SOP activities 620 that have been mapped to the respective model. Similarly, the SOP activities 620a, 620b, and 620c are mapped to ones of the project-management assets 602 that have been deemed particularly effective for those activities. In a typical embodiment, the P1MO model 615a, the P2MO model 615b, and the P3MO model 615b represent a sliding scale between less-aggressive management of fewer, lower-complexity projects to more-aggressive management of more numerous, higher-complexity projects.

In some embodiments, as shown in FIG. 6B, the SOP activities 620a, 620b, and 620c are directly mapped to the project-management assets 602. In these embodiments, for example, one of the SOP activities 620 may be included in each of the plurality of scaling models 615 yet be mapped to different ones of the project-management assets 602. In other words, different ones of the project-management assets 602 may be deemed beneficial depending on which one of the plurality of scaling models 615 is used. In other embodiments, only the SOP activities 620 are directly mapped to the project-management assets 602. In the other embodiments, regardless of which or how many of the plurality of scaling models 615 include a selected one of the SOP activities 620, the same ones of the project-management assets 602 may be mapped to the selected one of the SOP activities 620. This is because, in the other embodiments, the plurality of scaling models 615 is mapped to the project-management assets 602 via the SOP activities 620. Additionally, in various embodiments, each model in the plurality of scaling models 615 may represent a separate set of SOP activities that is not based on a set of common SOP activities in the form of the SOP activities 620.

Figure 6C:
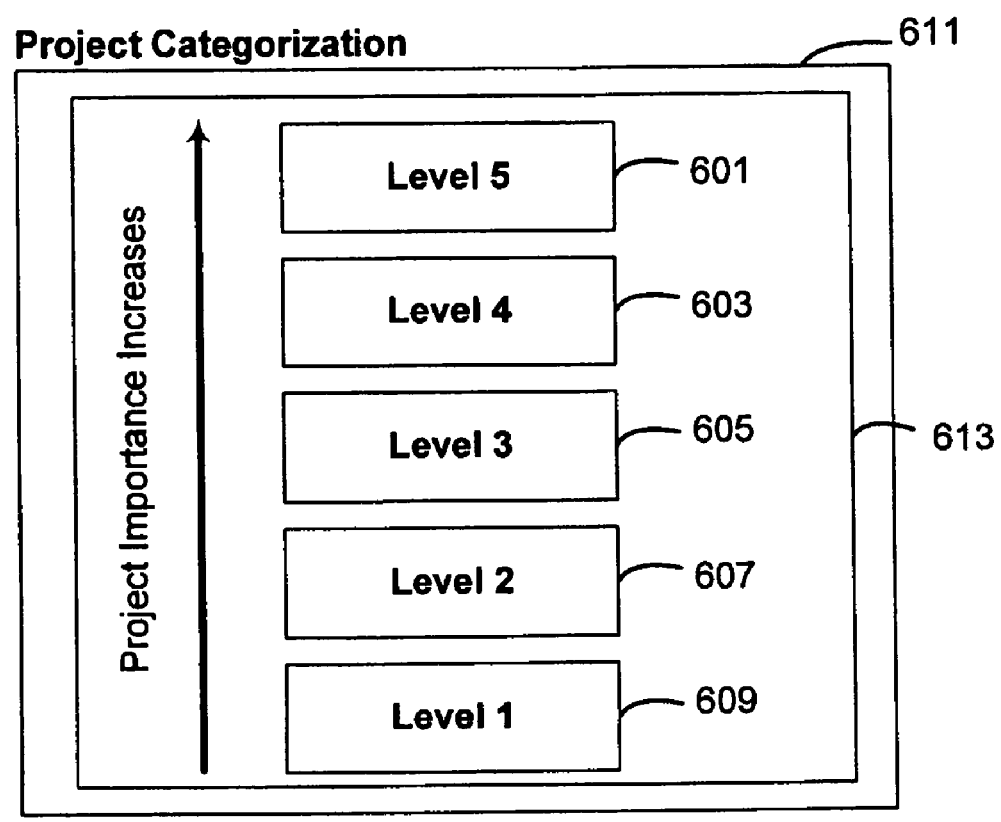
FIG. 6C illustrates a project categorization or determining project complexity.

FIG. 6C illustrates a project categorization 611 for determining project complexity, which categorization, in some embodiments, assists in selecting one of the plurality of scaling models 615. In a typical embodiment, the project categorization 611 is based on project size, risk, and complexity. The project categorization 611 enables projects to be rated at different project levels 613. As noted above, the project categorization 611 is created to provide a project-rating standard that encompasses project size, risk, and complexity. Project size, risk, and complexity determine critical projects. Projects may be categorized into one of five levels, including a level 5 601, a level 4 603, a level 3 605, a level 2 607, and a level 1 609. The projects are categorized into different levels based upon, for example, a survey that includes inquiries regarding the projects being evaluated. Each question in the survey applies corresponding scores and weights to the answers. At the conclusion of the survey, an accumulated score for each project is gathered. The accumulated score is compared to a threshold. Based upon a comparison of the accumulated score to the threshold, the projects are categorized in different project-level categorizations 613.

For example, the following inquiries may be conducted: 1) Is the project budget greater than $5 million? 2) Is the total customer budget for a project, which is not part of the organization's project budget, greater than $5 million? If the answer to both the inquiries is true, the accumulated score is 10. The same criteria is followed for all inquiries and an accumulated score for every project being evaluated is obtained.

Project survey scores in the amounts are listed in Table 1. The project survey scores may be used to categorize the projects as follows:

TABLE 1

| PROJECT LEVEL | SURVEY SCORE |
|---|---|
| 5 | 40-65 |
| 4 | 30-39 |
| 3 | 24-29 |
| 2 | 18-23 |
| 1 | 1-17 |

For example, a project having a project score between 40-65 will be considered a level 5 project. A project having a project score between 30-39 will be considered a level 4 project. A project having a project score between 24-29 will be considered a level 3 project. A project having a project score between 18-23 will be considered a level 2 project. A project having a project score between 1-17 will be considered a level 1 project. Table 2 illustrates an exemplary project complexity survey form which is utilized in categorizing projects in different project-level categorizations 613.

TABLE 2

| PROJECT COMPLEXITY/RISK SURVEY | | | | |
|---|---|---|---|---|
| | Category | Answer | Score | Comments |
| 1 | Total Project or Program Budget? | Greater Than $5M | 5 | |
| 2 | Total Customer budget for this project, which is NOT part of The Organization's projected budget? | Greater Than $5M | 3 | |
| 3 | Current FTE headcount assigned to the project? | Greater than 50 | 5 | |

TABLE 2-continued

PROJECT COMPLEXITY/RISK SURVEY

| | Category | Answer | Score | Comments |
|---|---|---|---|---|
| 4 | Current customer FTE headcount assigned to the project? | Greater Than 50 | 3 | |
| 5 | What is the FTE cost percentage of the project's total costs? | Greater Than 75% | 2 | |
| 6 | Rate the customer's priority and business sponsorship of this project on a scale of 1-10 with 10 being the highest priority and fully engaged sponsorship? | 9-10 High | 5 | |
| 7 | Does the project involve resources outside of a division of The Organization and/or outside of The Organization? | Yes | 3 | |
| 8 | Does the project involve a competitor to The Organization where the competitor is responsible for project deliverables and is being paid for project work? | Yes | 5 | |
| 9 | Is this project based on a Fixed-Price, T&M, or Cost Plus contractual agreement with the customer? | Fixed-Price | 5 | |
| 10 | Is this project driven by a regulatory requirement with a mandatory compliance deadline? | Yes | 5 | |
| 11 | Characterize the project's scope from The Organization's point of view based on the following: Complex—Large numbers of applications, interfaces, platforms, geographic locations, deliverables, etc., and/or attempting something for the first time. Intermediate—Medium scope of involved applications, interfaces, platforms, locations, deliverables, and/or we will leverage established solutions to deliver this project. Simple—Small scale project similar to others we have successfully delivered many times previously. | Complex | 5 | |
| 12 | This project is best classified as custom application development, vendor application implementation, infrastructure enhancement, or process improvement? | Custom App. Development | 5 | |
| 13 | Which of the following statements best describes the project's skills requirement. Minimal Skills—We have limited capability with the required skills. Competent—We have some of the needed skills sets, but will be looking to augment from outside the account. Core Competency—We have a ready pool of properly skilled resources on the account who are available for assignment to this project | Minimal Skills | 5 | |
| 14 | What is the financial impact to The Organization if there are shortcomings in the scope, schedule, or resource commitments of this project? | Major impact | 6 | |
| 15 | Does this project deliver intellectual property to which The Organization has contractual rights? | Yes | 4 | |
| | Special Circumstances Override (do not exceed a total score of 65 using the override category) | | 0 | Override Comment: |
| | | Total Score = | | |

Scoring Legend
Scores 1-17 = Project Level 1
Scores 18-23 = Project Level 2
Scores 24-29 = Project Level 3
Scores 30-39 = Project Level 4
Scores 40-65 = Project Level 5

Referring again to FIG. 6B, the P1MO model 615a may be, for example, a basic model, encompassing a minimum set of ones of the project-management assets 102. The P1MO model 615a is generally adequate for managing a small volume of low-complexity projects (e.g., levels 1 to 3). In a typical embodiment, the P1MO model 615a saves project-management overhead for organizations but does not take into account a customer's strategies, as is typically necessary for program management and portfolio management.

The P2MO model 615b may be, for example, a slightly more complex model as a result of taking into account a customer's strategic goals. The P2MO model 615b manages a moderate to high volume of projects, with some being complex (e.g., level 4 or 5). Therefore, the P2MO model 615b is typically appropriate for program management.

The P3MO model 615c may be, for example, the most complex of the plurality of scaling models 615 of FIG. 6B and significantly supplements a customer's ability to achieve strategic business objectives. The P3MO model 615c is characterized by a very high volume of complex program and project work (e.g., level 4 or 5) that, for example, represents an entire organization or a business unit's portfolio. The P3MO model 615c is typically appropriate for portfolio management.

Figure 6D:
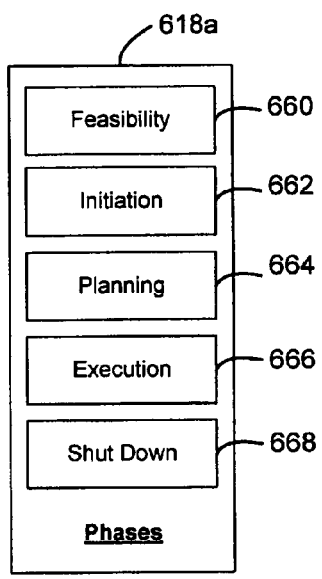
FIG. 6D illustrates a plurality of project phases.
Figure 7:
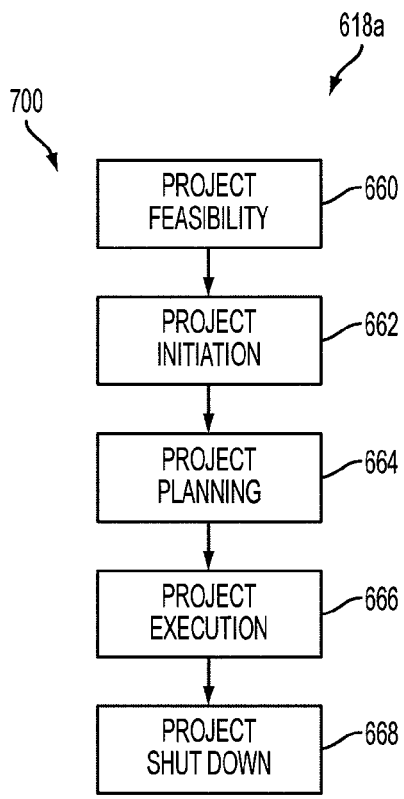
FIG. 7 illustrates a plurality of project phases.
Figure 8:
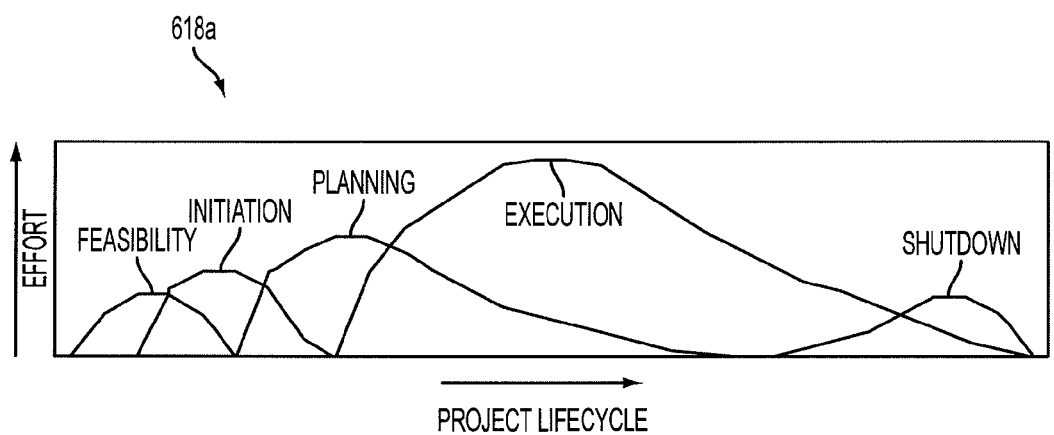
FIG. 8 illustrates a plurality of project phases.

FIG. 6D illustrates a plurality of project phases 618a. The plurality of project phases 618a are shown to include, for example, a feasibility phase 660, an initiation phase 662, a planning phase 664, an execution phase 666, and a shut down phase 668. FIG. 7 illustrates the plurality of project phases 618a in a sequential manner according to a project lifecycle 700. As shown in FIG. 8, the plurality of project phases 618a may overlap so that various SOP activities occurring within the plurality of project phases 618a occur concurrently. It is contemplated that other phases besides the plurality of project phases 618a may also be used without departing from the principles of the present invention.

Figure 9:
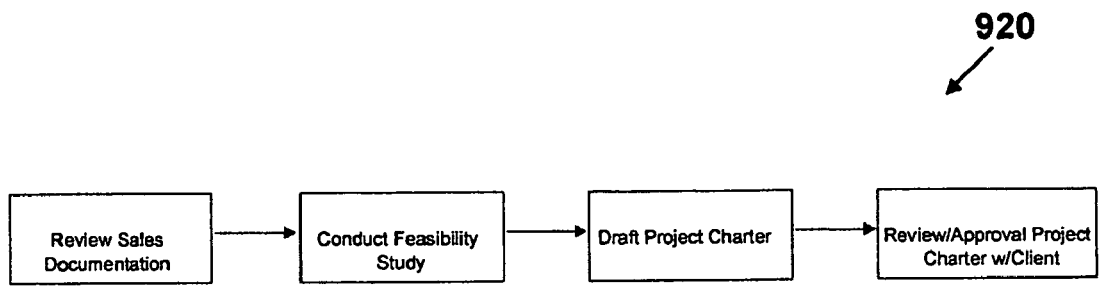
FIG. 9 illustrates exemplary activities that may occur within a feasibility phase.

FIGS. 9-13 illustrate exemplary SOP activities such as, for example, ones of the SOP activities 620 of FIG. 6A, that may be mandatory elements of the plurality of project phases 618a of FIG. 6A. FIGS. 9-13 will now be discussed in conjunction with FIG. 7. FIG. 9 illustrates exemplary SOP activities 920 that may occur within the feasibility phase 660.

Figure 10:
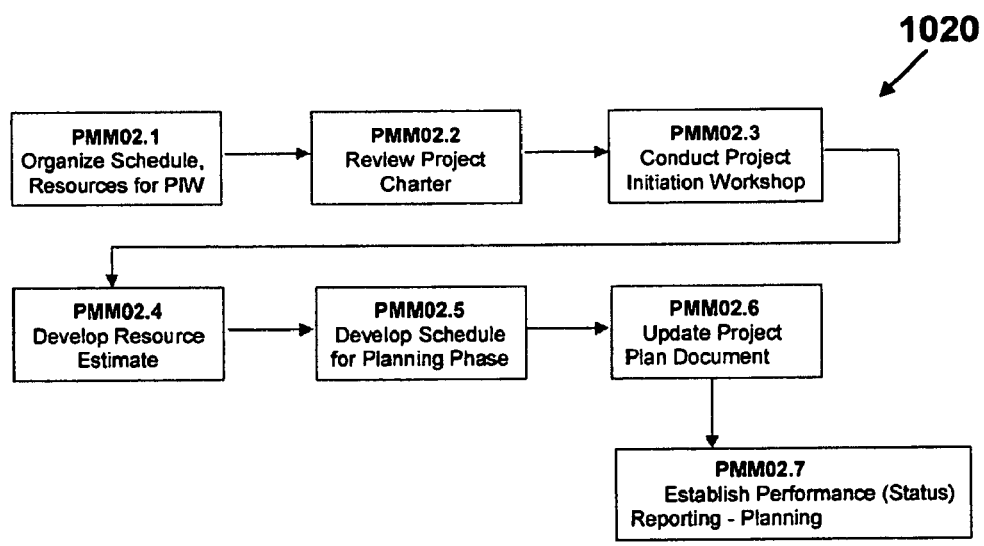
FIG. 10 illustrates exemplary activities that may occur within an initiation phase.
Figure 11:
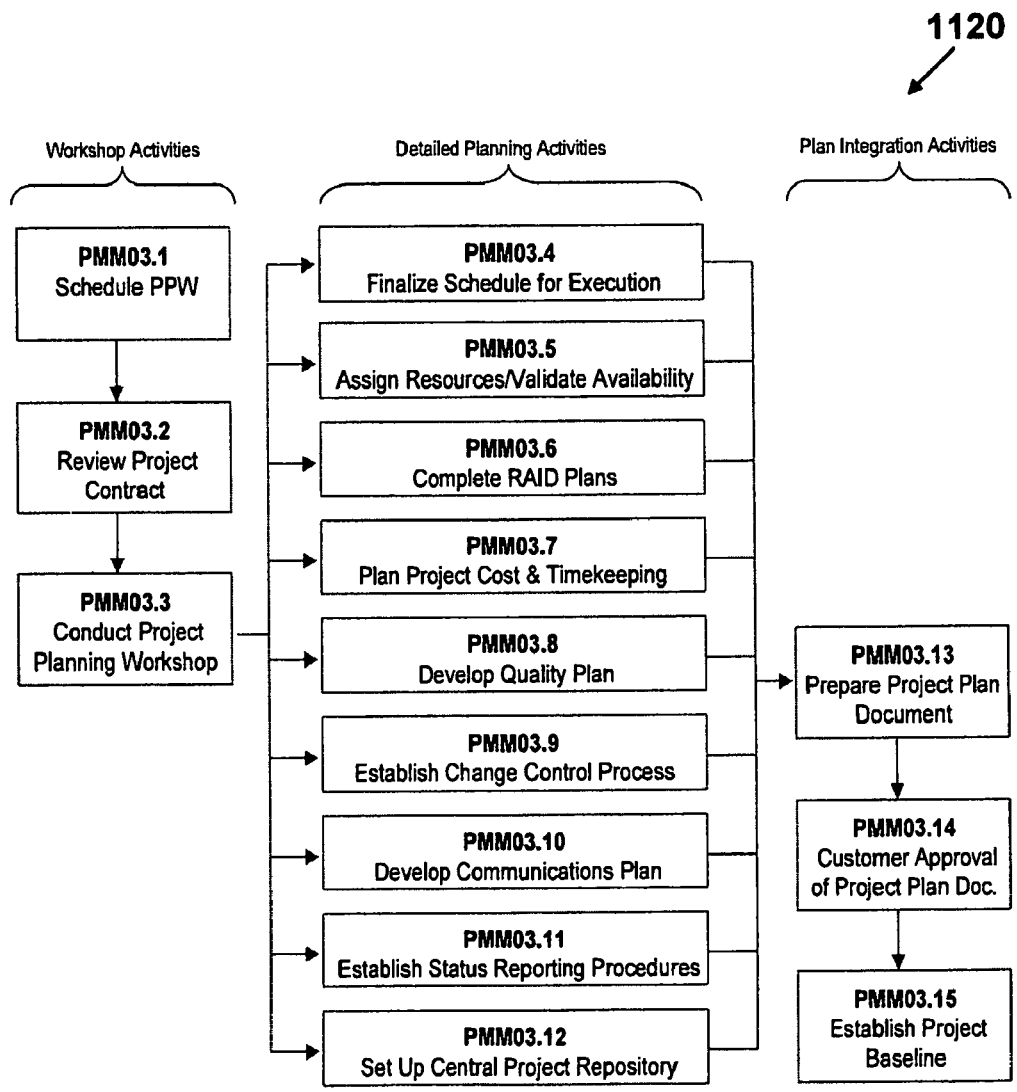
FIG. 11 illustrates exemplary activities that may occur within a planning phase.
Figure 12:
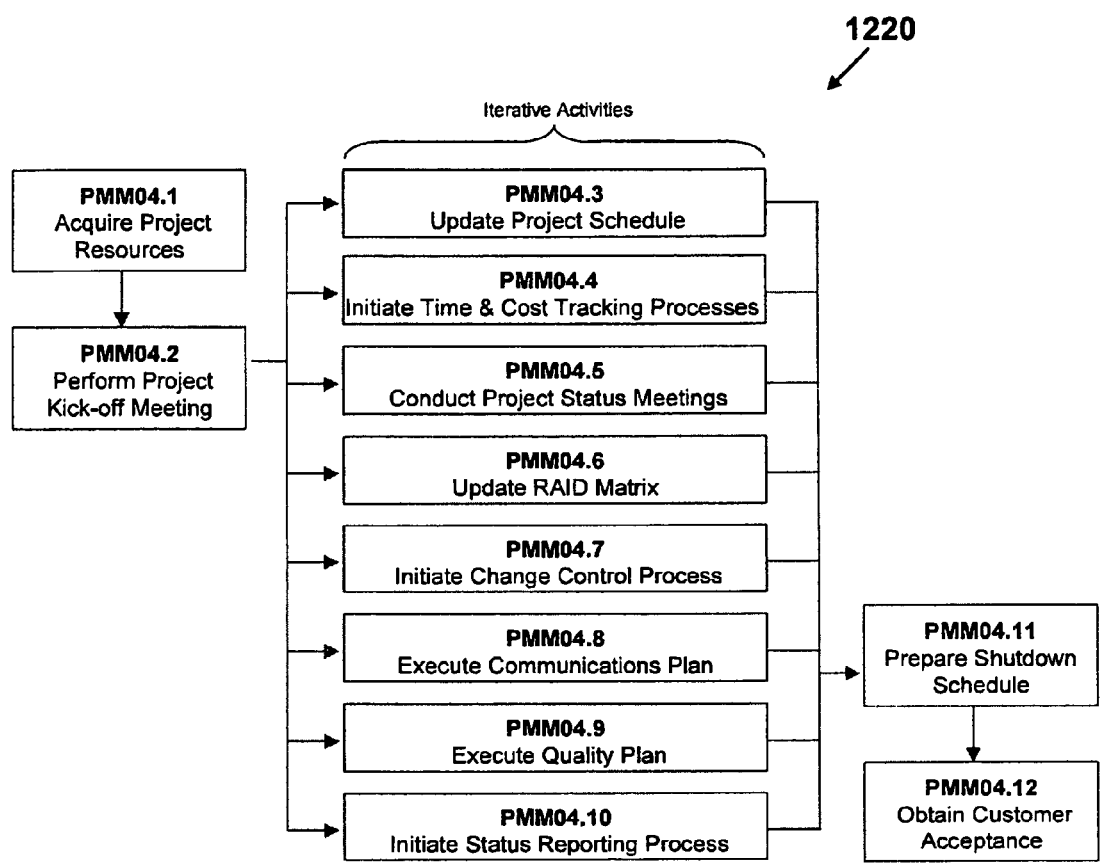
FIG. 12 illustrates exemplary activities that may occur within an execution phase.
Figure 13:
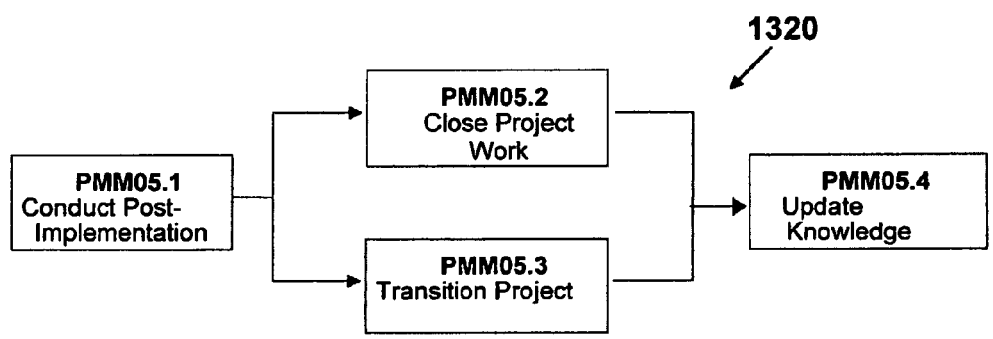
FIG. 13 illustrates exemplary SOP activities that may occur within a shut down phase.

FIG. 10 illustrates exemplary SOP activities 1020 that may occur within the initiation phase 662. FIG. 11 illustrates exemplary SOP activities 1120 that may occur within the planning phase 664. FIG. 12 illustrates exemplary SOP activities 1220 that may occur within the execution phase 666. FIG. 13 illustrates exemplary SOP activities 1320 that may occur within the shut down phase 668.

Table 3, Table 4, Table 5, Table 6, and Table 7 below indicate exemplary project-management assets that may be mapped to the feasibility phase 660, the initiation phase 662, the planning phase 664, the execution phase 666, and the shut down phase 668, respectively. Also indicated in the tables below are various inputs, outputs, and roles for various SOP activities in the respective phases. With reference to FIGS. 2 and 6D, in various embodiments, project-management assets such as, for example, those indicated in the tables below may be stored in the knowledge repository 212 and made available to the clients 214(1), 214(2), and 214(3) according to the multidimensional PMM-based data model 696.

TABLE 3

FEASIBILITY PHASE

| Activity | Responsible | Inputs | Assets | Outputs |
| --- | --- | --- | --- | --- |
| PMM01.1 Review Sales Documentation | Delivery Team | 1) Sales documentation 2) Solutions Certification Risk Assessment | Process: Sales Process | One or more potential solutions to the customer's business problem |
| PMM01.2 Conduct Feasibility Study | Delivery Team | Sales documentation | 1) Template: Feasibility Study 2) Survey: PMQP02-01- Project Survey Scoring tool 3) Technique: Problem Assessment Techniques | 1) Feasibility Study 2) Project Survey Scoring Tool (includes project level) 3) Recommended PMQP PM Certification Level to lead the project |
| PMM01.3 Draft Project Charter | Project Manager | 1) Initial approach information 2) Project Survey Scoring Tool (includes project level) 3) Recommended PMQP PM Certification Level to lead the project | 1) SOP: Project Integration Management - Develop Project Charter 2) Template: Project Charter | Project Charter |
| PMM01.4 Review/Approval of Project Charter with Customers | Project Manager | Draft Project Charter | 1) Initial approach information 2) Project Survey Scoring Tool (includes project level) 3) Recommended PMQP PM Certification Level to lead the project | 1) SOP: Project Integration Management - Develop Project Charter 2) Presentation: Project Management Overview |

TABLE 4

INITIATION PHASE

| Activity | Responsible | Inputs | Assets | Outputs |
| --- | --- | --- | --- | --- |
| PMM02.1 Organize Schedule & Resources for Project Initiation Workshop (PIW) | Project Manager | Customer commitment to conduct PIW | 1) Process: Project Initiation Workshop & Checklist 2) Template: PIW Agenda 3) Template: PIW Task Order 4) SOP: Project Integration Management - Develop Project Plan Document | 1) PIW Agenda 2) PIW Checklist |
| PMM02.2 Review Project Charter | Project Manager | Project Charter | SOP: Project Integration Management - Develop Project Plan | None |
| PMM02.3 Conduct Project Initiation Workshop (PIW) | Workshop Facilitator, Sales Lead, Project Manager | 1) Project Charter 2) PIW Invitation 3) PIW Agenda 4) Solution Certification | 1) Process: Project Initiation Workshop 2) Checklist: PIW Flip Chart Checklist 3) Presentation: PIW | Workshop materials, notes, flip charts, etc. |

TABLE 4-continued

INITIATION PHASE

| Activity | Responsible | Inputs | Assets | Outputs |
|---|---|---|---|---|
| | | Results (including Risk Assessment) | Slides 4) Template: Project Plan Document (PPD) - Flexibility Matrix 5) Template: Stakeholder Analysis 6) Template: Roles & Responsibilities 7) Template: Workshop Evaluation Form 8) Template: Workshop Evaluation Summary Report 9) Template: PMQP05-01-PMM Self Assessment.xls 10) Standards: PMQP-SharePoint Library Standards.doc 11) SOP: Project Integration Management - Develop Project Plan Document | |
| PMM02.4 Develop Resource Requirements Estimate | Service Design Lead, Delivery Team, Project Manager | 1) WBS 2) Timeline 3) High-level Requirements | 1) Global Deal Review Policy 2) Template: Cost Management Tool | Resource Estimate |
| PMM02.5 Develop Project Schedule for Planning Phase | Project Manager | 1) High-level WBS 2) Project Charter | 1) SOP: Project Time Management - Phase Activity Definition 2) Standard: Schedule Quality Verification (MS-Project Schedule Standards) 3) Template: Project Schedule Template | Schedule for Planning |
| PMM02.6 Develop Project Plan Document (PPD | Project Manager | Please refer to the Integration Management SOP | 1) Template: Project Plan Document 2) SOP: Project Integration Management - Develop Project Plan Document | Project Plan Document (PPD) |
| PMM02.7 Establish Performance (Status) Reporting for Planning Phase | Project Manager | 1) Project Plan Document (PPD) 2) SOP: Enterprise Governance - P3MM Manual, Sections 2.0, 4.1 | Template: Project Status (Performance) Report | Project Status (Performance) Report |

TABLE 5

PLANNING PHASE

| Activity | Responsible | Inputs | Tools/Techniques | Outputs |
|---|---|---|---|---|
| PMM03.1 Schedule Project Planning Workshop (PPW) | Project Manager | Project Plan Document (PPD) v1 | 1) Process & Checklist: Project Planning Workshop (PPW) 2) Detailed planning activities 3) Template: PPW Agenda 4) PPW Invitation 5) SOP: Project Integration Management - Develop Project Plan Document | 1) PPW Agenda 2) PPW Checklist |
| PMM03.2 Review Project Contract | Project Manager | 1) Contract or Task Order 2) Proposal Material 3) Deal Review documents 4) Service Level | None | Adjustments to Project Plan to conform to contract |

TABLE 5-continued

PLANNING PHASE

| Activity | Responsible | Inputs | Tools/Techniques | Outputs |
| --- | --- | --- | --- | --- |
| | | Agreements<br>5) Results from Risk Assessment<br>6) RAIDO Items from Sales Review Cycle | | |
| PMM03.3<br>Conduct Project Planning Workshop (PPW) | Workshop Facilitator, Project Manager | 1) Project Planning Document v1<br>2) PPW Agenda<br>3) PPW Checklist | 1) Process & Checklist: Project Planning Workshop<br>2) Presentation: PPW Slides<br>3) Template: Project Plan Document<br>4) Standards: PMQP<br>5) SOP: Project Integration Management - Develop Project Plan Document | Workshop materials, notes, flipcharts, etc. |
| PMM03.4<br>Finalize Project Schedule for Execution Phase | Project Manager, Program Management Office, Delivery Team | 1) Project Plan Document<br>2) Work Breakdown Structure Diagram<br>3) Work Breakdown Structure Dictionary<br>4) Cost Model<br>5) Delivery Methodology | 1) Template: Project Schedule (from Delivery Methodology)<br>2) SOP: Project Time Management - Activity Definition; Activity Sequencing; Activity Estimating<br>3) SOP: Project Scope Management - Scope Definition<br>4) Standard: Schedule Quality Verification (MS-Project Schedule Standards) | Project Schedule |
| PMM03.5<br>Assign Resources and Validate Availability | Project Manager, Program Management Office | 1) Project Schedule<br>2) Resource Estimate (PMM02.4) | 1) SOP: Project Time Management - Activity Resource Estimating<br>2) Standard: Schedule Quality Verification (MS-Project Schedule Standards) | Resource-loaded Project Schedule |
| PMM03.6<br>Complete RAIDO (Risks, Assumptions, Issues, Definitions and Out-of-Scope) | Project Manager, Program Management Office Certification | 1) PPW Documentation<br>2) Risk Assessment from Solution<br>3) RAIDO Items collected from the Sales Cycle | SOP : RAIDO Management | Completed RAIDO |
| PMM03.7<br>Plan Project Cost & Timekeeping Procedures | Project Manager, Financial Coordinator | Contract or Task Order | 1) Financial Coordinator<br>2) Account Management Methodology | None |
| PMM03.8<br>Develop Quality Plan | Project Manager, Program Management Office | PWW documentation | 1) Quality Planning chapter of the Project Quality Management SOP<br>2) Chapter 3 from Delivery Methodology(s)<br>3) Project Management Quality Program (PMQP)<br>4) Template: Quality Plan part of the Project Plan Document (PPD) | Quality Plan |
| PMM03.9<br>Establish Change Control Process | Project Manager, Program Management Office | None | 1) SOP: Project Integration Management - Develop Project Plan Document (PPD)<br>2) Template: Change Request Form<br>3) Template: Change Request Log<br>4) Microsoft Project Server SharePoint or Fusion list | Change Control Process |
| PMM03.10<br>Develop Communications Plan | Project Manager, Program Management Office | 1) Stakeholder Analysis (from PIW or PPW Report)<br>2) Project Schedule<br>3) Communication Planning Guidelines<br>4) PMQP RASIC Tables for the Roles and Responsibilities | 1) Guideline: Communications Planning Guidelines<br>2) Template: Communications Plan Matrix and Calendar (Comms Workbook)<br>3) Template: Communications Plan (PPD) | 1) Communications Plan<br>2) Communication Matrix and Calendar |

TABLE 5-continued

PLANNING PHASE

| Activity | Responsible | Inputs | Tools/Techniques | Outputs |
|---|---|---|---|---|
| | | involved in the Plan Certification Process and Project Health Assessments | 4) Template: Document Distribution Matrix | |
| PMM03.11 Establish Performance (Status) Reporting for Execution Phase | Project Manager, Program Management Office | 1) Communications Plan 2) Quality Plan | 1) Template: Project Status Report 2) Template: Communications Plan Matrix and Calendar (Comms Workbook) | Performance (Status) Report Format - Execution Phase |
| PMMO3.12 Set up Central Project Repository | Project Manager, Program Management Office | 1) Communication Plan (in the PPD) 2) Stakeholder Analysis (Comms Workbook) 3) PMQP-SharePoint Library Standards | Standard: Fusion Project Site Template | Central project repository |
| PMM03.13 Develop Project Plan Document (v2) | Project Manager, Program Management Office | 1) Draft PPD 2) Project Schedule 3) RAIDO Plans 4) Quality Plan 5) Change Control Process 6) Communications Plan 7) Performance (Status) Report Example | 1) Draft PPD 2) Project Schedule 3) RAIDO Plans 4) Quality Plan 5) Change Control Process 6) Communications Plan 7) Performance (Status) Report Example | 1) Project Plan Document 2) Project Plan Certification Results (required for all Level 4 and 5 projects and fixed-price L3 projects.) |
| PMM03.14 Obtain Customer Approval of Project Plan Document | Project Manager | 1) Project Plan Document 2) Project Plan Certification Results | 1) SOP: Project Integration Management - Develop Project Plan Document 2) Review Meeting with Project Sponsor | Signed Project Plan Document |
| PMM03.15 Establish Project Performance (Status) Baseline | Project Manager, Program Management Office | 1) Signed Project Plan Document 2) Completed Project Scoring Survey Tool Schedule Standards) | 1) SOP: Project Time Management - Schedule Control 2) Schedule Quality Verification (MS-Project Survey Tool | 1) Baseline project schedule and budget 2) Revised PMQP Project Scoring 3) Revised PMQP PMM Compliance Scorecard |

TABLE 6

EXECUTION PHASE

| Activity | Responsible | Inputs | Tools/Techniques | Outputs |
|---|---|---|---|---|
| PMM04.1 Acquire Project Resources | Project Manager | Project Plan Document | Account Management Methodology | Committed project staff |
| PMM04.2 Perform Project Kick-off Meeting | Project Manager | 1) Contract or Task Order 2) Project Plan Document 3) Technical Requirements document | 1) Template: Kickoff Meeting Agenda 2) Template: Kickoff Meeting Minutes | 1) Kickoff Meeting Agenda 2) Kickoff Meeting Minutes |
| PMM04.3 Update Project Schedule | Project Manager, Program Management Office | Project Schedule | 1) SOP: Project Time Management - Schedule Control 2) Schedule Quality Verification (MS-Project Schedule Standards) 3) SOP: Quality Management | Updated Project Schedule |
| PMM04.4 Initiate Time & | Project Manager, Program | 1) Profit and Loss Reports from | Template: Cost Management | Cost Management Workbook |

TABLE 6-continued

| | EXECUTION PHASE | | | |
|---|---|---|---|---|
| Activity | Responsible | Inputs | Tools/Techniques | Outputs |
| Cost Tracking Processes | Management Office | Corporate Finance 2) Quality Plan | Workbook | |
| PMM04.5 Conduct Project Performance (Status) Meetings | Project Manager, Program Management Office | Please refer to activity table in Integration Management - Monitor and Control Project Work | 1) SOP: Project Integration Management - Monitor and Control Project Work 2) Template: Performance (Status) Meeting Minutes | Performance (Status) Meeting Minutes |
| PMM04.6 Update RAIDO | Project Manager, Program Management Office | Completed RAIDO | SOP: RAIDO Management | Updated RAIDO |
| PMM04.7 Integrated Change Control | Project Manager, Program Management Office | Please refer to the Integration Management SOP | 1) SOP: Project Integration Management - Integrated Change Control 2) SOP: Project Time Management - Schedule Control 3) Change Control Process (within PPD) | Approved Change Requests |
| PMM04.8 Execute Communications Plan | Project Manager, Program Management Office | Communications Plan (from PMM03.10) | 1) Template: Project Communications Calendar (Comms Workbook) 2) Technique: Team Calendar Getting Started Guide (for Microsoft Outlook) | Project Communications Calendar |
| PMM04.9 Execute Quality Plan | Project Manager, Program Management Office | Quality Plan (see PMM03.8) | 1) Perform Quality Assurance and Perform Quality Control chapters of the SOP section on Project Quality Management 2) Project Management Quality Program (PMQP) 3) Updated Project Schedule (see section PMM04.3) 4) Cost Tracking Worksheet (see section PMM04.4) 5) Other metrics sources 6) SOP: Project Time Management - Schedule Control | 1) Metrics 2) PMQP Project Health Assessment Results 3) Authorization-to-Proceed decisions 4) Review Feedback 5) Identified Project Process Improvement Opportunities 6) Project Plan Document (Updates) |
| PMM04.10 Monitor and Control Project Work | Project Manager, Program Management Office | Please refer to the Integration Management SOP | 1) SOP: Project Integration Management - Monitor and Control Project Work 2) Performance | Performance (Status) Report |

TABLE 6-continued

EXECUTION PHASE

| Activity | Responsible | Inputs | Tools/Techniques | Outputs |
|---|---|---|---|---|
| PMM04.11 Prepare For Shutdown | Project Manager | Post Project Scorecard activities | (Status) Report Format (from section PMM03.11) Template: Shutdown Schedule | 1) Shutdown Schedule 2) Lessons Learned |
| PMM04.12 Scope Verification | Project Manager | 1) Performance measurement baseline 2) Approved change requests 3) PMQP Post Project Scorecard | 1) SOP: Project Scope Management - Scope Verification 2) Template: Deliverable Definition (PPD) 3) Template: Customer Acceptance Sign-off | 1) Customer Sign-off on Deliverable Definitions signifying their acceptance of each deliverable 2) Customer Project Acceptance Sign-off 3) Completed PMQP Post Project Scorecard |

TABLE 7

SHUTDOWN PHASE

| Activity | Responsible | Inputs | Tools/Techniques | Outputs |
|---|---|---|---|---|
| PMM05.1 Conduct Post-Project Review | Project Manager, Program Management Office | 1) Post-Project Review meeting 2) Post Project Scorecard | Template: Post-Project Report | Post-Project Report |
| PMM05.2 Close Outstanding Project Work | Project Manager, Program Management Office | Updated project schedule | Technical and business disciplines appropriate for each uncompleted task | Completed tasks |
| PMM05.3 Transition Project Staff | Project Manager, Client Executive | None | Methodology: Account Management Methodology | New assignments for project staff |
| PMM05.4 Update Account Level Organization Knowledge Database | Project Manager, Program Management Office | Project documentation | 1) Fusion Web site 2) Microsoft Project Server SharePoint sites | Archived documents |
| PMM05.5 Publish Success Stories | Project Manager, Program Management Office | 1) Project best-practices 2) Project lessons-learned | 1) Fusion Web site 2) Microsoft Project Server SharePoint sites | Published success stories |

Figure 6E:
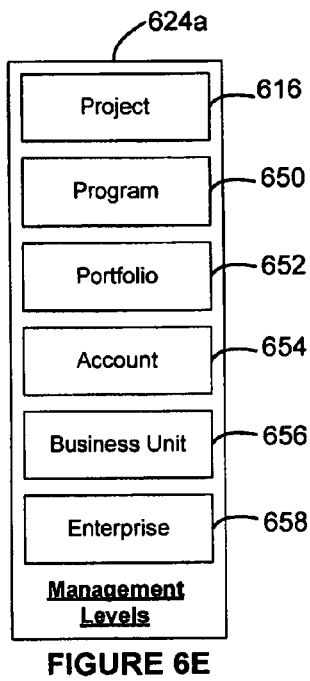
FIG. 6E illustrates a plurality of management levels.

FIG. 6E illustrates a plurality of management levels 624a that may be utilized in conjunction with the multidimensional PMM-based data model 696 of FIG. 6A. The plurality of management levels 624a includes a project level 616, a program level 650, a portfolio level 652, an account level 654, a business-unit level 656, and an enterprise level 658. The plurality of management levels 624a may be further divided into two groups such as, for example, a classification that is project-driven and a classification that is enterprise-driven. In a typical embodiment, the project level 616, the program level 650, and the portfolio level 652 may be considered project-driven because, generally, each of these management levels is utilized due to a strategic commonality between various projects that is independent of an organization's internal structure. Conversely, the account level 654, the business-unit level 656, and the enterprise level 658 may be considered enterprise-driven because, generally, each of these management levels is operable to manage projects based on an organization's internal structure rather than any strategic commonality between various projects.

Still referring to the plurality of management levels 624a of FIG. 6E, the project-driven group including the project level 616, the program level 650, and the portfolio level 652 will now be discussed. A project, as used herein, is a unique process including a set of coordinated and controlled activities with start and finish dates, undertaken to achieve an objective conforming to specific requirements including constraints of, for example, time, cost and resources. A program, as used herein, refers to a group of projects managed in a coordinated way to obtain benefits not available from managing the projects individually. A program may be of indefinite duration. Therefore, a program may contain many projects in varying stages of completion. A portfolio, as used herein, refers to an effective, centralized management (including identifying, prioritizing, authorizing and controlling) of a collection of projects or programs and other work that are grouped together to meet strategic business objectives. The projects or programs of the portfolio may not necessarily be interdependent or directly related. At the project level 616, the program level 650, and the portfolio level 652, management is typically the ultimate responsibility of a project manager, a program manager, and a portfolio manager, respectively.

Still referring to the plurality of management levels 624a of FIG. 6E, the enterprise-driven group including the account level 654, the business-unit level 656, and the enterprise level 658 will now be discussed. An organization may have a plurality of customers. Based on an internal governance structure, the organization may have one or more business units that logically subdivide the organization. For example, the organization may have business units of, for example, healthcare, government services, and insurance. Additionally, the organization may have a plurality of customers for whom the organization is performing multiple projects. Using this example, managing at the business-unit level 656 may be considered managing the projects being handled by a particular business unit within the organization and managing at the enterprise level 658 may be considered managing the projects being handled across all of the organization's business units. Continuing with this example, managing at the account level may be considered managing, as a group, all of the projects for a particular customer.

Figure 6F:
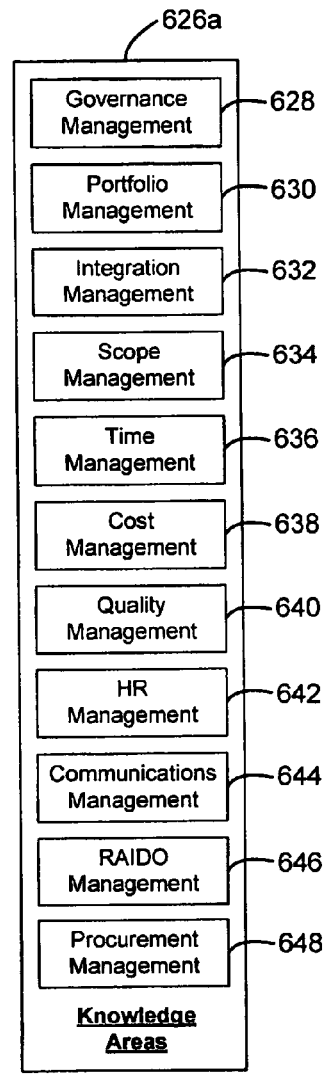
FIG. 6F illustrates a plurality of knowledge areas.

FIG. 6F illustrates a plurality of knowledge areas 626a operable to be utilized in conjunction with the multidimensional data model 696 of FIG. 6A. The plurality of knowledge areas 626 includes, for example, a governance-management knowledge area 628, a portfolio-management knowledge area 630, an integration-management knowledge area 632, a scope-management knowledge area 634, a time-management knowledge area 636, a cost-management knowledge area 638, a quality-management knowledge area 640, a human-resources (HR) management knowledge area 642, a communications-management knowledge area 644, a risk-management knowledge area 646, and a procurement-management knowledge area 648. The governance-management knowledge area 628 and the portfolio-management knowledge area 630 will be discussed in more detail below. The remaining ones of the plurality of knowledge areas 626a shown in FIG. 6A are standard knowledge areas specified by the Project Management Institute (PMI) and will not be discussed in further detail herein.

Figure 14:
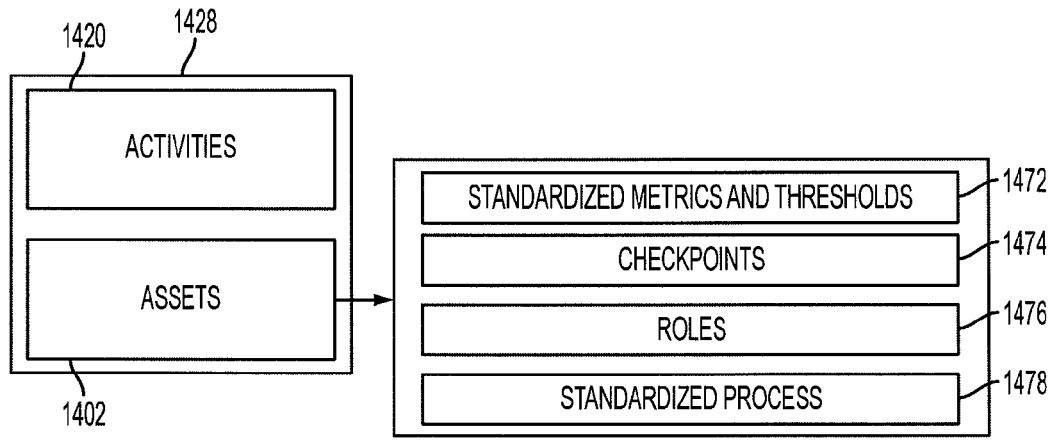
FIG. 14 illustrates an embodiment of a governance-management knowledge area.

FIG. 14 illustrates an embodiment of a governance-management knowledge area 1428. Via a data model such as, for example, the multidimensional PMM-based data model 696 of FIG. 6A, the governance-management knowledge area 1428 includes, for example, a plurality of SOP activities 1420 and project-management assets 1402. The project-management assets 1402, as shown, may be further expanded into standardized metrics and thresholds 1472, checkpoints 1474, roles 1476, and a standardized governance process 1478. In a typical embodiment, the project-management assets 1402 of the governance-management knowledge area 1428 are in accordance with a project management quality plan (PMQP). The PMQP is a standard for quality practices in project and program management. As such, the PMQP contains standards for categorizing projects according to size, complexity, and risk, certifying project managers to manage projects of various levels, and standards for conducting project plan certifications and project-health assessments.

In a typical embodiment, an objective of the governance-management knowledge area 1428 is to monitor and control global project delivery performance enterprise-wide, as well as oversee an adoption of, and compliance with, for example, the universal framework 300 described above with respect to FIG. 3. In a typical embodiment, one component of the governance-management knowledge area 1428 is operable to provide early warning and identification of underperforming projects through timely, objective, and quantitative performance reporting. Another component of the governance-management knowledge area 1428 is operable to facilitate rapid response for intervention and remediation, thus reducing the negative impacts to financial reports and customer satisfaction. In addition, the governance-management knowledge area 1428 facilitates an ongoing continuous improvement process for project-management standards and project-management assets.

Referring more specifically to the standardized metrics and thresholds 1472 of FIG. 14, in various embodiments of the invention, governance management is facilitated via specification of a set of standard, quantitative project-performance metrics. A metric, as used herein, specifically describes what something is and how the quality of it is to be measured. A measurement is an actual value. In a typical embodiment, metrics are inputs into the plurality of SOP activities 1420 that occur as part of the governance-management knowledge area 1428.

Table 8 below lists an exemplary set of metrics by various categories of metrics. Table 8 additionally indicates that metrics may be associated with one or more knowledge areas such as, for example, ones of the plurality of knowledge areas 626 in FIG. 6A and one or more SOP activities such as, for example, the SOP activities 620 in FIG. 6A.

TABLE 8

| Category | Metric | Calculation | Collection Method (source) and Reporting Method | Associated SOP Knowledge Area & Activity |
| --- | --- | --- | --- | --- |
| Schedule Performance | Schedule Earned Value/Planned Index (SPI) | EV/PV = SPI Effort-based schedule - Value | MS-Project Schedule Management - Monitor and see schedule standards Project Status Report | Project Integration Control Project Work Project Time Management - Schedule Control |
| Schedule | Schedule Variance (SV) | EV − PV = SV Earned Value − Planned Value (in $) | MS-Project Schedule Management - Monitor and see schedule standards Project Status Report | Project Integration Management - Monitor and Control Project Work Project Time Management - Schedule Control |
| Schedule | Variance of Plan Completion | Baseline Dates compared to Actual Dates for the following standard project milestones:<br>1. Plan Project Complete<br>2. Go Live Complete | MS-Project Schedule Project Status Report | Project Integration Management - Monitor and Control Project Work Project Time Management - Schedule Control |

TABLE 8-continued

| Category | Metric | Calculation | Collection Method (source) and Reporting Method | Associated SOP Knowledge Area & Activity |
|---|---|---|---|---|
| Customer Satisfaction | Customer Satisfaction Rating | 3. Close Project Complete 1-7 Rating on the Overall Project: 1 = very dissatisfied, 2 = dissatisfied, 3 = somewhat dissatisfied, 4 = neutral, 5 = somewhat satisfied, 6 = satisfied, 7 = very satisfied | Deliverable Definition Documents signoffs Project Status Report Overall Acceptance of the Project - Project Signoff form | Project Integration Management - Monitor and Control Project Work Project Scope Management - Scope Verification Project Quality Management |
| Cost | Variance At Completion (VAC) | BAC – EAC = VAC Budget At Completion - Estimate At Completion represents how on track the project is to meet the estimated project budget at completion | Cost Tracking Workbook Project Schedule (effort-based) Project Status Report | Project Integration Management - Monitor and Control Project Work Project Cost Management - Cost Monitoring and Control |
| Cost | Work Variance | Baseline "Work" Hours – (Actual "Work" Hours + Remaining "Work" Hours) | Cost Tracking Workbook Project Schedule (effort-based) Project Status Report | Project Integration Management - Monitor and Control Project Work Project Cost Management - Cost Monitoring and Control |
| Quality | Deliverables' Quality | Achieved by obtaining customer acceptance through signoff on each deliverable | Reported through the Project Status Report and PMQP Health Assessments Deliverable Definition Documents signoffs Overall Acceptance of the Project - Project Signoff form | Project Integration Management - Monitor and Control Project Work Project Cost Management - Cost Monitoring and Control |
| Quality | PMQP Project Plan Certifications | All Level 4 and Level 5 Project Plan Certification conducted by the BU PMO using the Project Management Assessment tool | PMQP Project Assessment Tool Project Schedule Project Status Report PMQP Plan Cert Results/ report | Project Management Quality Program (PMQP) Project Quality Management |
| Quality | PMQP Sales Cycle Plan Certifications | All Level 4 and Level 5 Project Plan Certification conducted by the BU PMO using the Project Management Assessment tool | PMQP Project Assessment Tool Project Schedule Project Status Report PMQP Plan Cert Results/ report | Project Management Quality Program (PMQP) Project Quality Management |
| Quality | Project Management Compliance Check (formerly called PMM Compliance Check) | Conducted by the BU PMO, or Account PMO, depending on Project Level, using the Project Management Assessment tool | PMQP Project Assessment Tool Project Schedule Project Status Report | Project Management Quality Program (PMQP) Project Quality Management |
| Quality | PMQP Project Reviews | All Level 4 and Level 5 Project Management Reviews conducted by the BU PMO using the Project Management Assessment tool | PMQP Project Assessment Tool Project Schedule Project Status Report PMQP Project Management Assessment Results/Report | Project Management Quality Program (PMQP) Project Quality Management |
| Quality | PMO Certifications | BU PMO review, using the PMO Org Calculator and PMO Organizational Plan Document | Solution Certification Report | Project Management Quality Program (PMQP) Project Human Resource Management - PMO Organization |

Still referring to the standardized metrics and thresholds 1472 of FIG. 14, the metrics such as, for example, those listed in Table 8, are afforded meaning when there are thresholds defining whether a metric is acceptable. Table 9 below provides exemplary thresholds that define degrees of acceptability or unacceptability for the metrics listed in Table 8. Towards that end, Table 9 lists four exemplary designations for a metric: red, yellow, green, and complete. A designation of "complete" indicates that all activities have been completed. A designation of "green" indicates that activities are being performed as required and no major problems exist. A designation of "yellow" indicates that there may be, for example, a metric below threshold and that a recovery plan exists for addressing the problem. A designation of red, like the designation of yellow, indicates that there may be, for example, a metric that is below threshold; however, with the designation of red, no recovery plan for addressing the problem has been approved.

TABLE 9

|  | RED | YELLOW | GREEN | COMPLETE |
| --- | --- | --- | --- | --- |
| Overall Status | | | | |
|  | An existing condition or event has resulted in unsatisfactory consequences. No recovery plan has been approved. | An unsatisfactory condition, unfulfilled requirement or undesirable result may be encountered. Significant issues exist, but there is an approved plan to solve them. | Conditions, results, etc. are performing as required and expected. No major project issues exist, and will continue to do so. | All events are complete and results, conditions closed out |
| Schedule Performance | | | | |
| Schedule Variance (SV) Variance of Plan Completion Schedule Performance Index (SPI) | Greater than or equal to +/−20% variance | Less than +/−20% variance | Within acceptable levels of variance: Less than +/−10% variance | Critical milestones are complete |
| Cost Performance | | | | |
| Variance At Completion (VAC) Work Variance | Greater than or equal to +30/−20% variance | Less than +/−20% variance | Within acceptable levels of variance: Less than +30/−10% variance | Critical milestones are complete |

Referring now more specifically to the checkpoints 1474 of FIG. 14, a checkpoint is an SOP activity such as, for example, one of the plurality of SOP activities 1420, that is utilized to validate that other SOP activities such as, for example, the SOP activities 620 of FIG. 6A, are executed. In a typical embodiment, the checkpoints 1474 are generally at junctures of the project lifecycle that are deemed critical. For example, during each of the checkpoints 1474, designated members of the organization and customer teams such as, for example, the project manager, may validate that milestones have been achieved, that the project is still sound, and that an investment of the customer and the organization in the project is properly protected. By fulfilling each of the checkpoints 1474, the project manager demonstrates due diligence to the customer and compliance with an organization's best practices.

Table 10 below lists, by phase, exemplary checkpoints and exemplary criteria for fulfilling the exemplary checkpoints. The roles 1476 and the standardized governance process 1478 will be described in more detail relative to FIGS. 15-17.

TABLE 10

| Activity | Phase | Checkpoint Criteria | Owner | Activity ID |
| --- | --- | --- | --- | --- |
| Review/Approval of Project Charter with Customer | Feasibility | Project Charter completed, signoff/approval received | Project Manager | PMM01-4 |
| Complete PMQP PMM Self Assessment Scorecard. | All | Complete appropriate section for each phase in the PMM. | Project Manager | PMQP05-01 |
| Conduct Project Initiation Workshop (PIW) | Initiation | PPD ver. 1.0 completed, roles and responsibilities defined | Project Manager | PMM02.3 |
| Conduct Project Plan Certification | Initiation | PPD ver. 2.0 and Schedule has been certified. | Account PMO (Level 1-3) BU PMO (Level 4-5) | PMM03-3 |
| Set Up Central Project | Planning | Mechanism/tool is functional | Project Manager | PMM03_12 |

TABLE 10-continued

| Activity | Phase | Checkpoint Criteria | Owner | Activity ID |
|---|---|---|---|---|
| Repository in Fusion | | and project team has access | | |
| Obtain Customer Approval of Project Plan Document | Planning | Document has been reviewed, approved, and signed by the customer | Project Manager | PMM03_14 |
| Update Project Schedule | Execution | Project schedule periodically updated and compared to baseline | Project Manager | PMM04_3 |
| Update RAIDO Plans | Execution | Risk and issue management in place | Project Manager | PMM04_6 |
| Initiate Change Control Process | Execution | Change requests are being processed | Project Manager | PMM04_7 |
| Execute Communications Plan | Execution | Communications activities conducted per plan | Project Manager | PMM04_8 |
| Initiate Performance (Status) Reporting Process | Execution | Formal Performance (Status) reports distributed periodically to project team and customer | Project Manager | PMM03.11 |
| Conduct Project Health Assessments | Execution | Project health assessment has been conducted, findings and recommendations have been addressed | Project Manager | PMQP05-01 PMQP05-02 |
| Conduct Post-Project Review | Shutdown | Post-Project Report distributed to project stakeholders | Project Manager | PMM05_1 |
| Complete PMQP Post-Project Scorecard | Shutdown | Post-Project Scorecard has been completed | Project Manager/ Project Sponsors | PMQP03-03-01 |

Figure 15A:
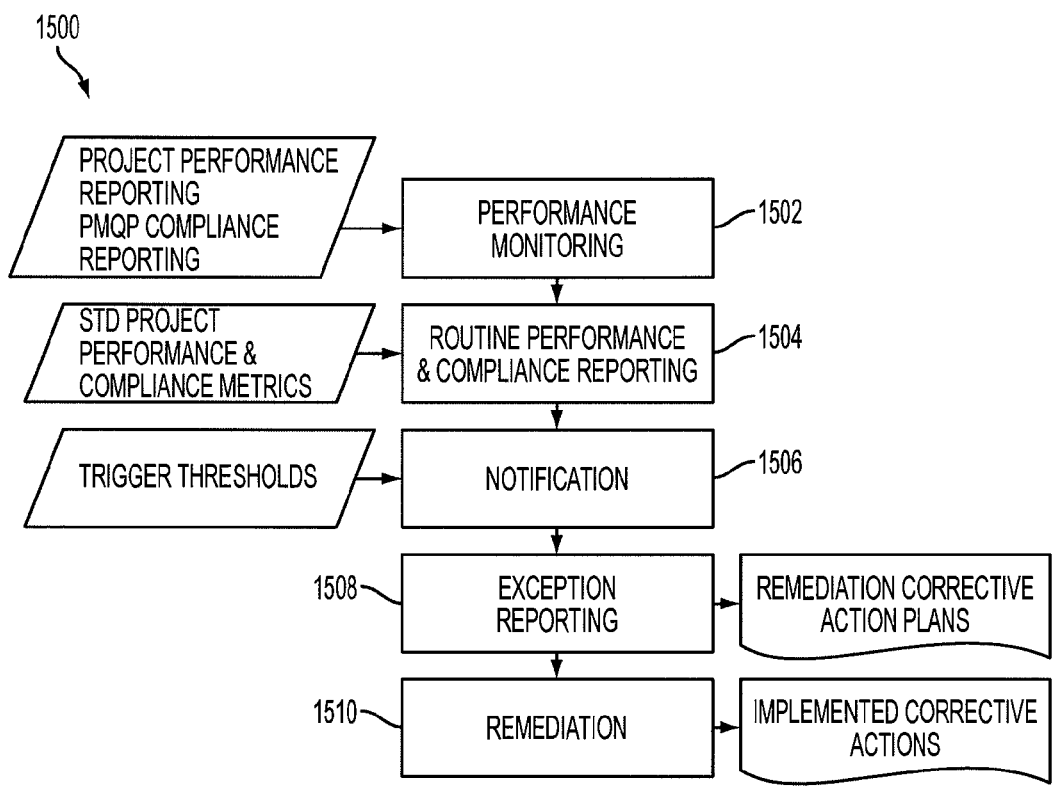
FIG. 15A illustrates an exemplary process that may be part of a standardized governance process.
Figure 16:
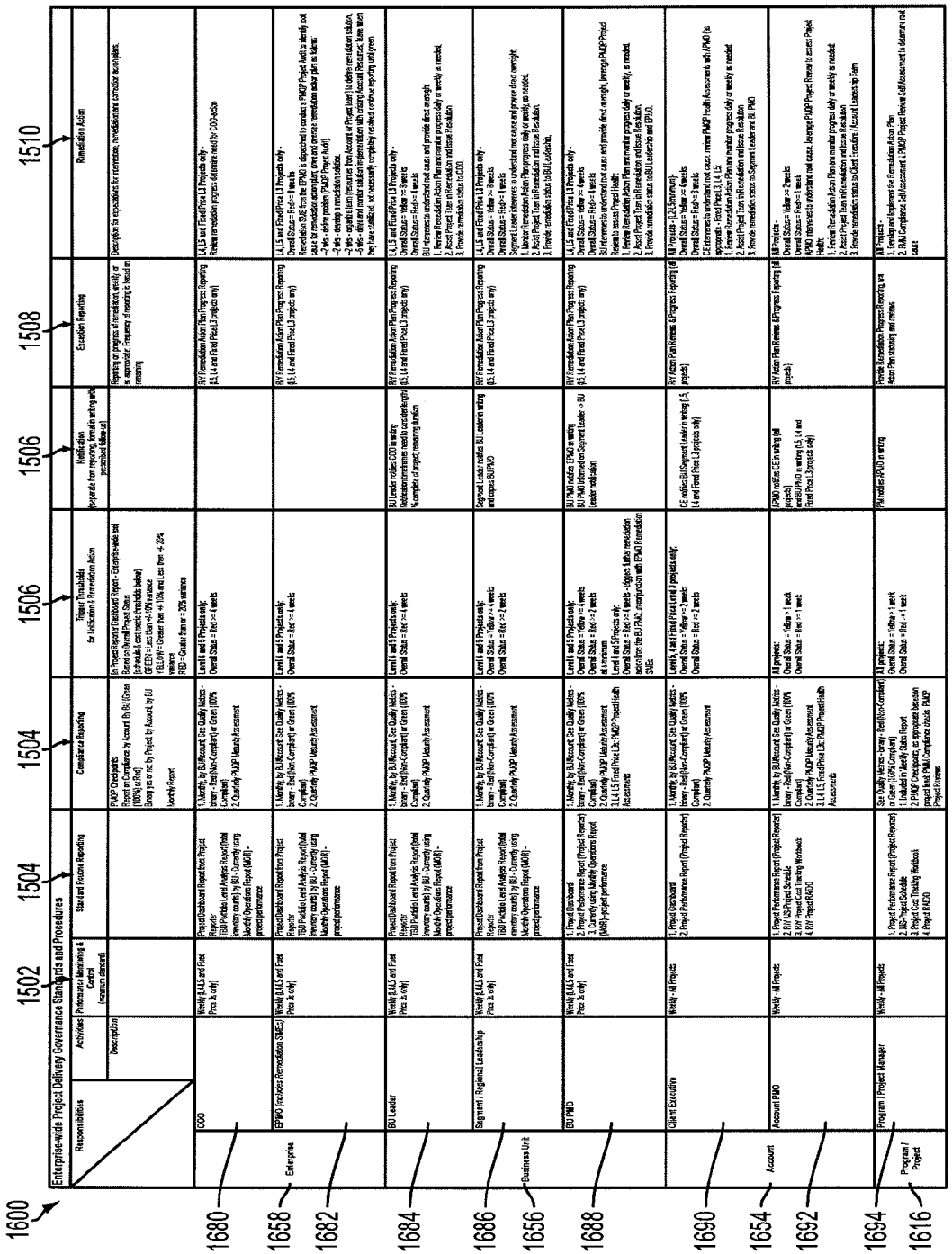
FIG. 16. illustrates a matrix for implementing an exemplary process.

FIG. 15A and FIG. 16 will now be described. FIG. 15A illustrates an exemplary process 1500 that may be part of the standardized governance process 1478 of the governance-management knowledge area 1428 in FIG. 14. FIG. 16 shows a matrix 1600 for implementing the exemplary process 1500. Initially, although the exemplary process 1500 is illustrated as steps, one of ordinary skill in the art will recognize that the exemplary process 1500 may have many instances within an organization and that these instances may be occurring simultaneously. Moreover, FIG. 16 shows that the various activities occurring at each step of the exemplary process 1500 may vary by management level and by role.

Referring now to FIG. 16 and the roles 1476 of FIG. 14 together, more specifically, the matrix 1600 defines roles for an enterprise level 1658, a business-unit level 1656, an account level 1654, and a program/project level 1616. At the enterprise level 1658, a chief operating officer (COO) role 1680 and an enterprise project management office (EPMO) role 1682 are defined. At the business-unit level 1656, a business unit (BU) leader role 1684, a segment/regional leadership role 1686 and a business unit project management office (BU PMO) 1688 are defined. At the account level 1654, a client executive role 1690 and an account PMO role 1692 are defined. At the program/project level 1616, a program/project manager role 1694 is defined. Intensity of project involvement generally increases from the enterprise level 1658 to the program/project level 1616.

Referring now more particularly to the exemplary process 1500 of FIG. 15A in conjunction with FIG. 16, at a performance-monitoring step 1502, performance monitoring occurs at regular intervals such as, for example, weekly. The performance monitoring at the performance-monitoring step 1502 may, in various embodiments, be formal or informal. For example, at the COO level 1680, the performance monitoring may include, for example, an electronic communication to a project manager or other project personnel. Alternatively, for example, at the program/project level 1616, the performance monitoring may include a more formal act such as for example, completing a standard check list. The matrix 1600 of FIG. 16 provides further examples for various management levels and roles.

Figure 15B:
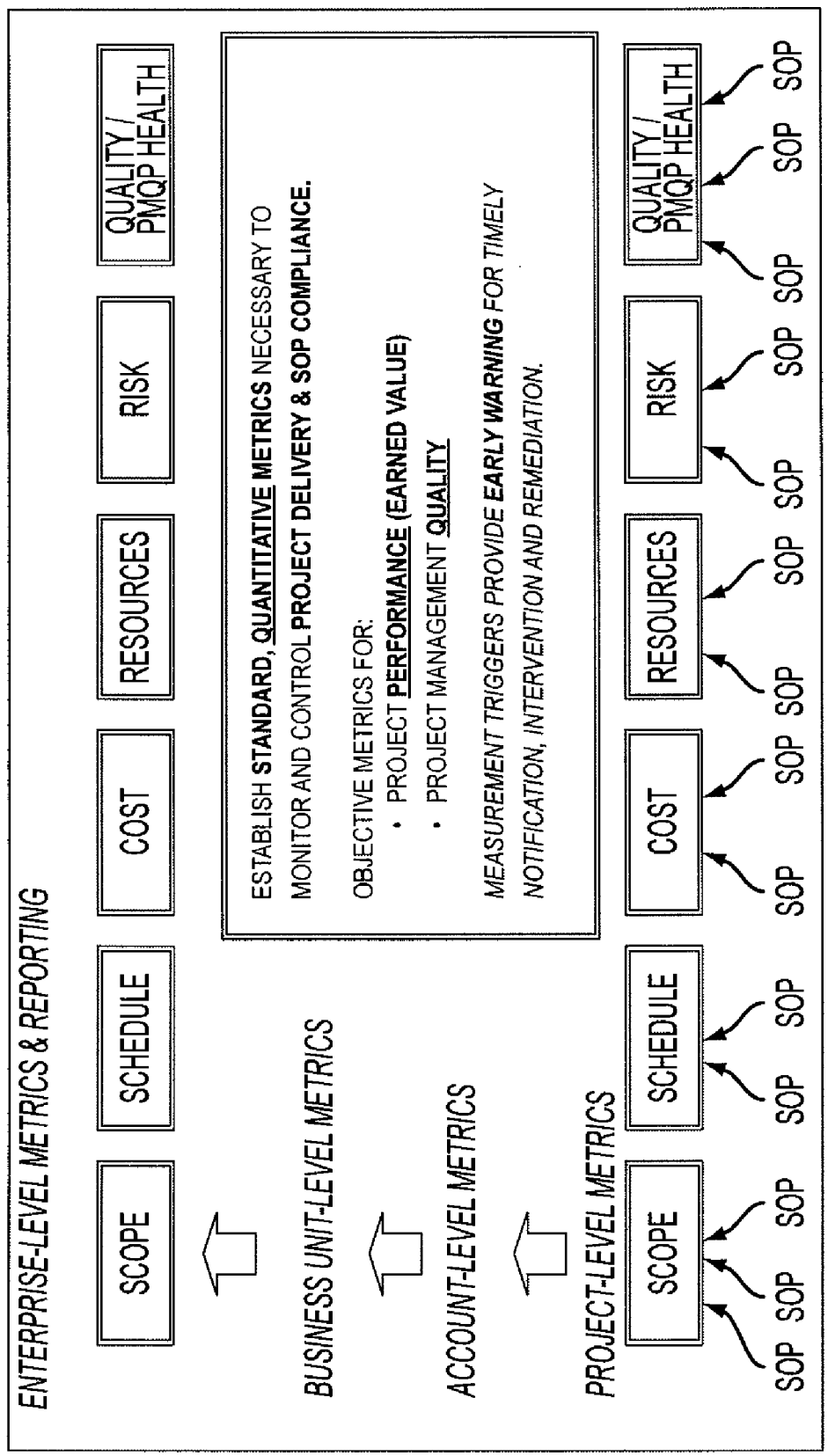
FIG. 15B illustrates metrics at various levels of management.

Still referring to FIG. 15A, at a reporting and compliance step 1504, standard reporting and compliance reporting may occur. Standard reporting includes, for example, regular, periodic reports by program, project, account, or business unit, as appropriate, on project performance. Compliance reporting focuses on producing, for example, a PMQP scorecard that lists, in a Boolean manner, whether each checkpoint is satisfied and whether each metric from the standardized metrics and thresholds 1472 is in compliance with a corresponding threshold from the standardized metrics and thresholds 1472. The matrix 1600 of FIG. 16 provides further examples for various management levels and roles. FIG. 15B illustrates that metrics may be produced at various levels of management including, for example, metrics for a project, an account, a business unit, and an entire enterprise.

Still referring to FIG. 15A, at a notification step 1506, various parties are notified that a metric from the standardized metrics and thresholds 1472 is out of compliance with a corresponding threshold from the standardized metrics and thresholds 1472. Unlike the other steps to the exemplary process 1500, the notification step is not routine but instead is triggered by the out-of-compliance metric. Moreover, the notification that occurs at the notification step 1506 is distinct from the reporting that occurs at the reporting and compliance step 1504. When the notification step 1506 is triggered, notification occurs in writing to predetermined personnel in a predetermined manner. The matrix 1600 of FIG. 16 provides examples of the notification. The notified personnel then must follow a predetermined follow-up procedure, which procedure will be described in further detail below relative to steps 1508 and 1510 of the exemplary process 1500.

Still referring to FIG. 15A, at exception reporting step 1508, follow-up reporting occurs at each management level in order to ensure that a remediation action plan is developed. In some embodiments, with reference to Table 9 above, a remediation plan is only required when, for example, an out-of-compliance metric is designated red or yellow. At remediation step 1510, any remediation plan that, for example, corrects the out-of-compliance metric is implemented. The matrix 1600 of FIG. 16 provides further examples for various management levels and roles.

FIG. 17 illustrates an exemplary project-management asset 1702 for the governance-management knowledge area 1428 of FIGS. 14-16. The exemplary project-management asset 1702 is an exemplary project status and action plan template for a business unit.

Referring again to FIG. 6F, the portfolio-management knowledge area 630 of FIG. 6F will be described in more detail. The portfolio-management knowledge area 630 is, in a typical embodiment, tightly integrated with a governance-management knowledge area such as, for example, the governance-management knowledge area 628 and the governance-management knowledge area 1428 of FIG. 14. As discussed above, project portfolio management is the centralized management of one or more project portfolios, which includes identifying, prioritizing, authorizing, managing and controlling projects programs and other related work, to achieve specific business objectives. The portfolio-management knowledge area 630, therefore, aligns management with a customer's business strategies and objectives. In that way, the customer's business strategies and drivers are generally objectively prioritized and decision rights and approval processes are, in turn, aligned between the customer and the organization.

Figure 18:
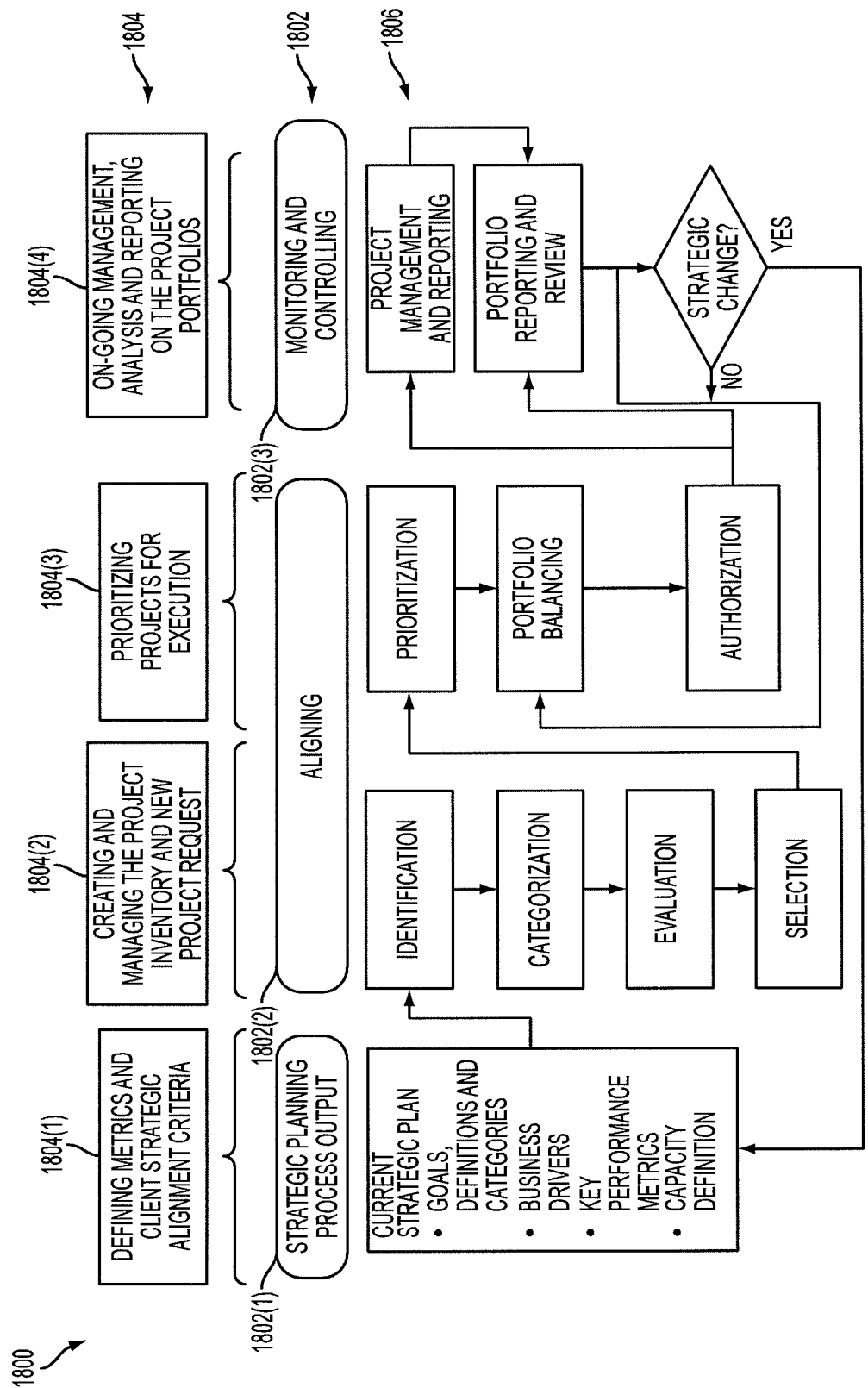
FIG. 18 illustrates a process for portfolio management.

FIG. 18 illustrates a process 1800 for portfolio management including, for example, the portfolio-management knowledge area 630 of FIG. 6F. The process 1800 divides a portfolio-management knowledge area into a plurality of process groups 1802, a plurality of sub-process groups 1804 within the plurality of process groups 1802, and a plurality of SOP activities 1806 within the plurality of sub-process groups 1804. The plurality of process groups includes a strategy process group 1802(1), an aligning process group 1802(2), and a monitoring and controlling process group 1802(3). The strategy process group 1802(1) further includes a sub-process 1804(1) for defining metrics and customer strategic-alignment criteria. The aligning process group 1802(2) further includes a sub-process 1804(2) for creating and managing project inventory and a new project request and a sub-process 1804(3) for prioritizing projects for execution. The monitoring and controlling process group 1802(3) further includes a sub-process 1804(4) for ongoing management analysis and reporting on various project portfolios.

Still referring to FIG. 18, in the strategy process group 1802(1), a strategic plan is developed for a project portfolio. The strategic plan includes, for example, goals, business drivers, and, as indicated by the sub-process 1804(1), key metrics and criteria for aligning projects within the project portfolio. In the aligning process group 1802(2), as part of the sub-process 1804(2), projects are identified, categorized, and evaluated and, ultimately, selected for possible inclusion in the portfolio based on, for example, the alignment criteria developed in the strategy process group 1802(1).

Still referring to FIG. 18, in the sub-process 1804(3) of the aligning process group 1802(2), the projects selected for possible inclusion in the project portfolio are prioritized for execution based on, for example, relative importance according to the business drivers. Additionally, the project portfolio is balanced, for example, to check that the projects selected for possible inclusion in the project portfolio represent a mix of projects that is consistent with the business drivers and both a customer's and an organization's tolerance for risk. Also as part of the sub-process 1804(3), the project portfolio is approved, for example, by a portfolio manager or a customer.

Still referring to FIG. 18, in the monitoring and controlling process group 1802(3), monitoring and reporting occurs in a manner similar to that described generally relative to the governance-management knowledge area 1428 of FIG. 14. However, a governance model specific to portfolio management is generally developed, which model involves periodically evaluating whether there has been a change such as, for example, a strategic change that necessitates a change in the project portfolio. In the case that a strategic change has occurred, further strategic planning occurs as part of the strategy process group 1802(1). In various embodiments, all or some of the features discussed herein may be part of the standardized PMM that is utilized across all projects, programs, and portfolios for one or more organizations.

Figure 19:
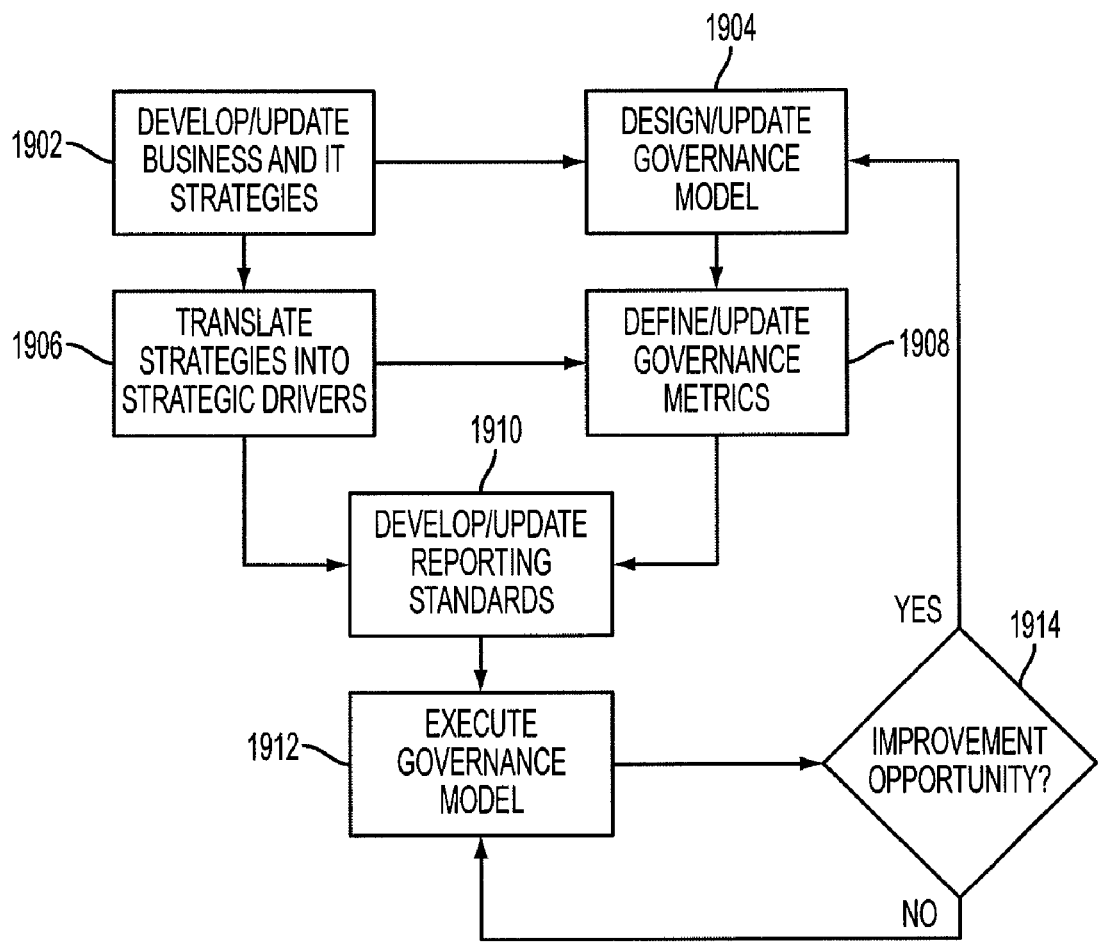
FIG. 19 illustrates a portfolio-governance process.
Figures 22, 23:
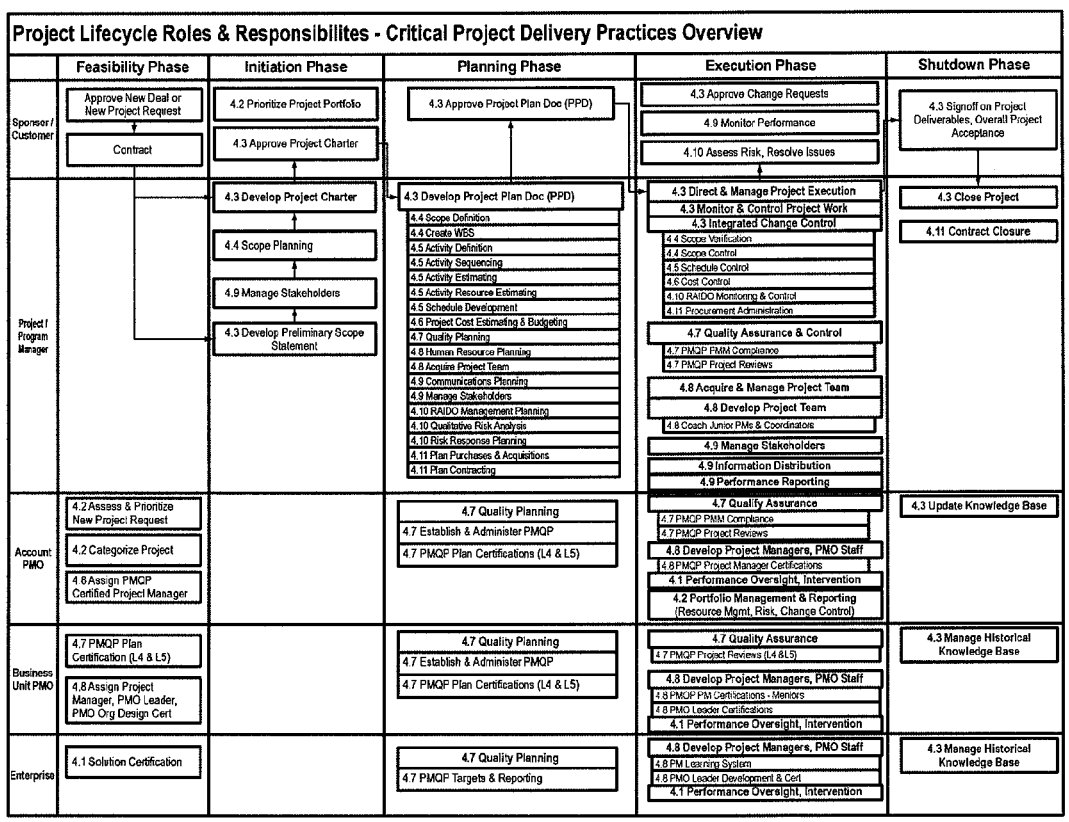

FIG. 19 illustrates a portfolio-governance process 1900 for developing and updating a governance model for a portfolio. At step 1902, business strategies are developed. The business strategies are typically strategies of, for example, an organization, business unit, or customer for achieving a sustainable competitive advantage in a chosen industry. Steps 1904 and 1906 occur concurrently. At step 1904, a governance model is developed. The governance model may be similar to that discussed relative to FIGS. 14-16. At step 1906, the business strategies developed in step 1902 are translated into strategic drivers. The strategic drivers are generally the critical factors that determine the success or failure of the business strategies. At step 1908, governance metrics such as, for example, those discussed above relative to FIGS. 14-16, are defined. At step 1910, reporting standards such as for example, those discussed above relative to FIGS. 14-16 are developed. At step 1912, the governance model developed in step 1904 is executed. At step 1914, at any point when possible improvements in the developed governance model are identified, the portfolio-governance process 1900 returns to step 1904 to update the governance model.

FIGS. 20-23 illustrate exemplary relationships among various knowledge areas, project phases, and project roles that are created via various SOP activities. One of ordinary skill in the art will recognize that may different types of relationships are possible and will be apparent to one of ordinary skill in the art.

Figure 24:
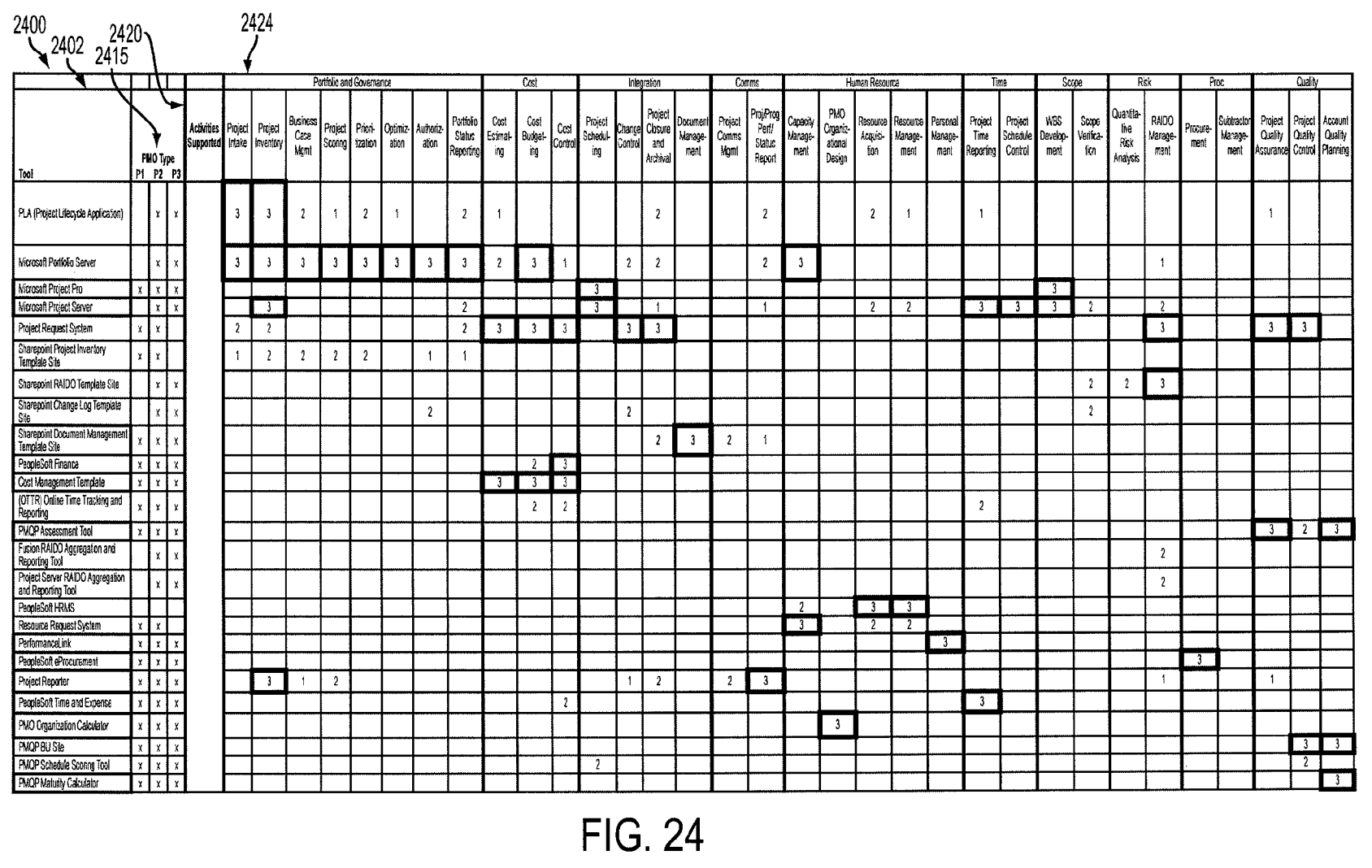

FIG. 24 is a listing 2400 of exemplary project-management assets 2402. The exemplary project-management assets 2402 are shown mapped to a plurality of scaling models 2415, a plurality of knowledge areas 2424, and a plurality of SOP activities 2420. FIG. 24 additionally depicts various project complexity levels for which ones of the exemplary project-management assets 2402 are required. One of ordinary skill will recognize that many different types of project-management assets are possible in accordance with principles of the present invention. By way of example, Table 11 and Table 12 below depict assorted COTS and custom technologies that may be used as project-management assets in various embodiments of the invention.

TABLE 11

| Tool | Description | Usage |
|---|---|---|
| Microsoft Project Pro and Project Server | Standard solution for developing and maintaining project schedules | Microsoft Project schedule required for all projects; Project Server required for all projects level three through five |

TABLE 11-continued

| Tool | Description | Usage |
| --- | --- | --- |
| PSC Project Reporter | Standard solution for reporting project status and performance metrics | Required for all projects level three through five |
| PeopleSoft | Standard solution for project finance, time and labor and procurement | Required for all projects |
| OTTR | Online Time Tracking and Reporting tool for extracting and reporting on project labor hours from PeopleSoft and managing project labor cost | Optional, but recommended for larger accounts where project managers are responsible for project cost tracking; standard PeopleSoft reporting will be sufficient for many account and engagement teams |
| Fusion Document Management | Standard solution for managing project documents | Required for all contractually mandated project deliverables and any documents that include the organization's intellectual property |
| Fusion RAIDO and Change Requests Management | Provide solution for managing project risks, assumptions, issues, definitions, out-of-scope items and change control | Recommended for all projects, however some accounts and engagements may use other solutions in order to facilitate customer access |
| PLA | Project Lifecycle Application for automating project intake, inventory, basic resource management and customer status reporting | Recommended for P2 and P3 accounts and engagements; smaller accounts have access to spreadsheet tools to facilitate the intake and inventory processes |
| PMO Organization Calculator | Standard tool for properly sizing an account or engagement PMO for both operational staff as well as project management staff | Required for sizing the PMO at all new account and engagement start-ups; recommended for usage at existing accounts on an annual basis or whenever project volumes are expected to change significantly |
| Microsoft Project Portfolio Server | Supports a formal project portfolio management processes, in particular the ranking and prioritization of projects | Recommended for all large accounts with a significant volume of projects; note that implementation of this tool requires a significant customer commitment and buy-in |

TABLE 12

| Tool | Tool Description | What's Automated |
| --- | --- | --- |
| Project Reporter | Project Reporter is a Web application used by Project Managers to track weekly project status. It provides a mechanism for Project Mangers to capture detailed, comprehensive data for use by Product Managers and sponsors relating to the projects under their control. | 1. Capturing and reporting on Project Status.<br>2. Calculating complex, industry-best practice, quantitative metrics, including Earned Value metrics<br>3. Generating PDF reports for the customer/project stakeholders<br>4. Generating executive dashboard summary views and reports, by Portfolio, by Account, by Segment, BU (Sponsoring Org or Delivery Org views) and Enterprise<br>5. Generating exports of project data for PMO reporting and portfolio analysis<br>6. aggregation of data across Accounts, Segments, business units, ultimately the enterprise<br>7. automating certain governance functions, including the prompting for Action Plans and detailed remediation action plan steps for all Red and Yellow projects; and prompting for a Project Manager Coach when a gap in the PM Certification exists based on the Project Level |
| Project Workbook | The Project Workbook is largely targeted at automating and incrementally improving the activities for quality checking a Project. The workbook provides mechanisms for helping the PM and PMO with quality checks and meeting project management work product /deliverable requirements for the project grouped by: Feasibility Phase, Initiation/Planning Phase, Execution Phase and Shutdown Phase. | Quality check of key components and/or project phases: Charter, Requirements, PPD, Schedule, Cost, RAIDO, Quality, & Status reporting. It also automates the consolidation of these quality checkpoints and certain post project metrics and assists in the generation of the Post Project Report. Mechanism for scoring the complexity of a project. |
| Cost Management Tool | The purpose of this tool is to help effectively manage the project to the cost baseline and manage cost variances to the satisfaction of the business sponsor. | Collection of baselined project cost by our 5 standard cost groups (labor, travel, hardware, software, and other) for each |

TABLE 12-continued

| Tool | Tool Description | What's Automated |
|---|---|---|
| | The cost baseline may include expenses for people, equipment, materials, and contingency. We have categorized the expenses according to Project Reporter, our system of record for project status into 5 major cost groups, which include: Labor, Travel, Hardware, Software, and Other expenses. | month of the project.<br>Collection of Actual Cost and Earned Value for each cost group and month as well as the determination of the Cost Variance.<br>Graphical representation of BAC versus EAC, Cumulative Performance via EV/AC/PV by month, CPI by month and monthly Earned Value.<br>Collection of Periodic ETC for each cost group and month.<br>Graphical representation of BAC versus EAC for forecasted data.<br>Consolidation of 6 key EV metrics by each Cost Group that are required to be reported on during each status reporting period. |
| Schedule Scoring Tool | The Schedule Scoring Tool scores a Microsoft Project Schedule file (.mpp file) based on specific criteria, standards and best practices of the Corporation. | 31 automatically scored objective criteria and standards that have been determined as key criteria for a good, accurate and functioning project schedule. Functioning properly in order to generate accurate Earned Value metrics, as well as dynamically adjust to project schedule changes due to delays or early finishes of tasks.<br>13 subjectively scored questions related to the 31 objectively scored criteria.<br>Each criteria is assigned a pass/fail value however is able to be overridden by the PM. A custom field in the Project Schedule is also populated for each line item in the project schedule indicating if any issues were identified.<br>Automates the PM self-check to help the PM build a solid, functioning schedule, meeting the organizations quality standards; as well as providing the PMO a tool to automate a very tedious and manual process to check the structure and quality of the schedule, as part of the overall health check of a particular project. This process used to take up to 8-16 hours, depending on the size of the project schedule, whereas now it may be executed in less than 1-2 hours. |
| PMO Organization Calculator & supporting PMO Organization Operational Data tool | A tool used to help ensure an effective PMO is designed and adequately staffed. It also includes the ongoing monitoring and controlling of actual performance against the baselined PMO Org Calculator and the PMO Organization Operational Data tool (P3MM08b-020 Manage PMO Organization Operational Data) | Based on some basic data entry, specific to the portfolio of projects and the customer engagement, automatically makes a recommendation for the amount of project management and PMO staff, as well as the types of roles to include, using standard PMO/PM roles/functions. In addition, automatically calculates the type of PMO, which is used to categorize the size, complexity and risk of the PMO engagement. This is also used to scale the PMO toolkit for the particular engagement. |
| RAIDO Management tool and Risk and Issues Reporting Application | A tool used to consolidate the management of Risks, Assumptions, Issues, Definitions and Out of Scope items. In addition, there's a supporting homegrown application that allows users to aggregate and perform standardized and ad hoc reporting against the RAIDO database. | Capturing of Risk, Assumptions, Issues, Definitions and Out of Scope items.<br>Calculating Risk ratings;<br>Automation of graphing of Risk Thresholds for both the project delivery team as well as the project sponsor.<br>Plotting of a risk profile using the likelihood and impact values for each risk. This is done for both the initial as well as revised risk profile.<br>RAIDO dashboard summarizing Risk Metrics and Exposure, graph of impact and likelihood of impact over time as well as aging reports for Issues, Assumptions and Out of Scope items. |
| Communication Management Tool | A tool used to facilitate and summarize the management of project stakeholders and key messages which make up the key components of Communication Management on a project. | Health check of management of stakeholders for a project.Health check of key messages for a project. |
| Requirements Traceability Matrix | The Requirements Traceability Matrix provides a mechanism to map from high-level Business Objectives, Requirements through to deliverables, test cases, and project acceptance criteria. | Mapping of a projects' business objectives, requirements, deliverables, test cases and project acceptance criteria. |

TABLE 12-continued

| Tool | Tool Description | What's Automated |
|---|---|---|
| Project Schedule Template | The MS Project Schedule Template is a highly customized MS Project template for use by all the project managers. It is built based upon our key Project Management areas and ties directly to the methodology. It has built in links for tasks that allow direct navigation to SOPs. Special views have been built to help automate and facilitate the calculation and display of data necessary to effectively manage a project and transfer data to other PMIS tools. | The necessary tasks, milestones, deliverables associated with managing a project using the P3MM. Automates some of the schedule standards, interdependencies across standard tasks, incorporating all standard checkpoints, streamlining the activity for the Project Manager; |
| Project Plan Document | The Project Plan document template provides our PM's with a standard document template used for recording plans for completing the specific project. It contains the detailed plans that show the results of applying our methodology for planning this project. This section includes the plan for completing the deliverables in the scope of the project. | |
| Project Plan Document Appendix | The Project Plan document Appendix template provides our PM's with a standard document template used for documenting 9 Management plans, specific deliverable definitions, and project schedule for completing the specific project. It also includes a copy of the charter for this project. | |
| P3MM SharePoint Site | A SharePoint based site for the P3MM. It includes navigation elements, P3MM assets, ability to capture feedback. | |
| Process Asset Repository | A SharePoint based document repository of all of the P3MM process assets. | |
| SharePoint Project Site Template | The SharePoint Project Template is a customized | RAIDO Management Change Request Management |
| PM Certification Workbook | The Project Manager Certification process defines qualification criteria in the areas of classroom instruction and practical project management experience. Project Managers are rated as Beginner, Performer, Master, and Mentor as they progress along the certification path. | Determination of what PMQP Level a Project Manager is qualified for. |
| PC Certification Workbook | The Project Coordinator Certification process defines qualification criteria in the areas of classroom instruction and practical project management experience. Project Coordinators are rated as Tier I, Tier II and Tier III as they progress along the certification path. This certification provides a better view of the individual progress. | Determination of what PMQP Level a Project Coordinator is qualified for. |
| IT Governance Maturity Assessment & Design Toolkit (more information on these tools is available in the Portfolio Governance SOP, the IT Gov Maturity Assessment/Model Overview PPT and individual MS-Word overview documents for each of the tools in the IT Gov Toolkit. There are multiple tools used in assessing and designing a best practice IT Governance Model, included in the P3MM: 1. IT Governance Maturity Model and associated IT Governance Maturity Assessment XLS Tool 2. IT Governance Model Selector 3. IT Governance Participant Framework 4. IT Governance Value Discipline Review 5. Prioritizing IT Governance Capabilities | IT Governance specifies the decision rights and provides an accountability framework to drive up good IT usage behaviors and good IT outcomes aligned with customer business strategies. The collection of practices that help optimize IT-enabled investments, ensure service delivery and provide measures against which to judge when things have gone wrong and require corrective intervention. These practices ensure that IT is aligned with the customer's business strategies, enables their business practices, uses IT resources responsibly, and manages risks appropriately. The IT Governance Capabilities are: IT Governance Framework IT Strategic Planning Process IT Enterprise Architecture Process Governing IT Organization, & Resource Management Governing IT Investment & Project Portfolio Management Communicating Governance Governing IT Risks Governing IT Regulatory Compliance The IT Governance Capability Maturity Model is part of the P3MO Methodology, IT Governance. Using tools in the P3MO methodology assess the maturity level of the IT Governance capabilities practiced on the account by the customer. Combine the results of a capability maturity assessment with knowledge about the customer's primary business strategies as expressed by their Value Disciplines. Knowing the current maturity level and value disciplines allows for selection of P3MO processes and deliverables appropriate to the current state maturity of IT Governance, and establish a path towards optimal IT Governance maturity in each of | The IT Governance Maturity Assessment tool actually has two options: IT Governance Maturity Assessment - Single This version of the workbook is constructed to have only a single set of answers to the questions used to generate the maturity assessment. IT Governance Maturity Assessment - Multiple This version of the workbook is constructed to process multiple respondents' answers to the questions used to generate the maturity assessment. The Multiple entry workbook has a second workbook that functions as the input tool for participants: IT Governance Maturity Assessment - User Form This version of the workbook is the input device used for capturing the questionnaire responses when there are multiple respondents. The results are copied and pasted into the Multiple tool for the generation of the charts and maturity level assessment. Each of these workbooks is covered in their own section in this documentation The IT Governance Maturity Assessment process is a simple one. The respondent(s) completes the questionnaire The respondent(s) can be either the PMO or the customer's participants (optimum). If the PMO completes the questionnaire, the results are based on observation and analysis by the PMO team. These can be |

TABLE 12-continued

| Tool | Tool Description | What's Automated |
|---|---|---|
| | the capability areas.<br>The IT Governance Maturity Assessment tool is part of the P3MO Methodology, IT Governance. This Excel based tool is used to assess the maturity level of the IT Governance capabilities practiced in the PMO account and by the customer. Knowing the current maturity level allows the PMO account team to craft PMO processes and deliverables appropriate to the current state of maturity of IT Governance. Further, the process helps the account define a path towards an optimal or target IT Governance maturity in each of the capability areas. | used to generate a startup conversation with the customer management about the validity of the observations and assumptions. If the customer completes the questionnaire, the results can be used to validate the customer's belief of where his company is in terms of Governance and prompt a conversation about improvement and reaching a target level of performance. The questionnaire is answered as True/False based on the respondent's understanding of the customer's current environment. If the respondent is filling in values directly into the spreadsheet (Single user) the calculations and chart are completed immediately as the questionnaire is completed and an overall maturity assignment is made. If the respondent is filling in values directly into the User form questionnaire, they will have to wait until the values are copied into the Multiple workbook before an aggregate assessment of all the responses is created and charted. |
| 2. IT Governance Model Selector | The IT Governance Model Selector will help the PMO identify and communicate the attributes of IT Governance capabilities that will become the customer's IT Governance model. IT Governance specifies the decision rights and provides an accountability framework to drive up good IT usage behaviors and good IT outcomes aligned with the customer's business strategies. This is accomplished through the IT Governance capabilities of• IT Governance Framework• IT Strategic Planning Process• IT Enterprise Architecture Process • Governing IT Organization, & Resource Management• Governing IT Investment & Project Portfolio Management• Communicating Governance• Governing IT Risks• Governing IT Regulatory ComplianceThe IT Governance Model Selector specifies the characteristics and behaviors of each IT Governance capability necessary to deliver the customer's chosen value proposition via one of the value disciplines:• Operational Excellence,• Client Intimacy• Product Leadership | |
| 3. IT Governance Participant Framework | The single purpose of this IT Governance process tool is to assist the accounts team in identifying by title, the people who should be required or at least considered as participants and decision makers in the various governance bodies within the customer organization.<br>A large database of corporate and healthcare titles has been created on the workbook tab labeled Participant Coding. In addition, each title has been evaluated and a determination made whether it would be a participant (P) and provide input only or a decision maker in the various governance bodies. Decision makers have been further broken down in terms of those roles that are required (RM) and those that are recommended for consideration (CM) | |
| 4. IT Governance Value Discipline Review | This tool is part of the P3MO Methodology, IT Governance.<br>communicate the concepts of Value Disciplines, establish a common understanding of what operations in the various value disciplines look like, and determine what type of PMO support is needed to either align the customer's IT Governance and PMO operational support with their declared value disciplines, or create 'responsive' PMO tailored to their current conflicted operations.<br>IT Governance specifies the decision rights and provides an accountability framework to drive up good IT usage behaviors and good IT outcomes aligned with the customer business strategies. IT Governance is executed through a set of core IT Governance capabilities:<br>IT Governance Framework<br>IT Strategic Planning Process<br>IT Enterprise Architecture Process | The purpose of this tool is to |

TABLE 12-continued

| Tool | Tool Description | What's Automated |
|---|---|---|
| | Governing IT Organization, & Resource Management<br>Governing IT Investment & Project Portfolio Management<br>Communicating Governance<br>Governing IT Risks<br>Governing IT Regulatory Compliance<br>The operational aspects of IT Governance must align with the Value Discipline the customer is working under (Operational Excellence, Customer Intimacy, or Product Leadership). The PMO needs to understand which dominant value disciplines the customer is driving towards; both what their declared posture is, AND what their current state operational model actually is Think of Value Disciplines as a "style" put on top of the core IT Governance Capabilities. All customers need mature IT Governance capabilities in order to optimize IT alignment with business goals, but the style of how they are implemented is driven by the customer's Value Disciplines, which in turn defines the customer's enterprise posture on autonomy versus synergy in the execution and processes of IT Governance.<br>Single/Multiple/User<br>The IT Governance Value Discipline Review tool actually has two options:<br>IT Governance Value Discipline Review - Single<br>This version of the workbook is constructed to have only a single set of answers to the questions used to generate the Governance Capabilities.<br>IT Governance Value Discipline Review - Multiple<br>This version of the workbook is constructed to process multiple respondents' answers to the questions used to generate the Governance Capabilities.<br>The Multiple entry workbook has a second workbook that functions as the input tool for participants:<br>IT Governance Value Discipline Review - User Form<br>This version of the workbook is the input device used for capturing the questionnaire responses when there are multiple respondents. The results are copied and pasted into the Multiple tool for the generation of the charts and maturity level assessment. | |
| 5. Prioritizing IT Governance Capabilities | The Prioritizing IT Governance Capabilities tool is part of the P3MO Methodology, IT Governance. This Excel based tool is used to assess the maturity level of the IT Governance capabilities practiced in the account and by the customer. Knowing the current maturity level allows the PMO/account team to craft PMO processes and deliverables appropriate to the current state of maturity of IT Governance. Further, the process helps the account define a path towards an optimal IT Governance maturity in each of the capability areas.<br>The Prioritizing IT Governance Capabilities includes a questionnaire whose results are immediately tabulated, with the results generating a maturity diagram for the account and the customer to use as they move forward in the governance optimization.<br>Single/Multiple User<br>The Prioritizing IT Governance Capabilities tool actually has two options:<br>Prioritizing IT Governance Capabilities - Single<br>This version of the workbook is constructed to have only a single set of answers to the questions used to generate the Governance Capabilities.<br>Prioritizing IT Governance Capabilities - Multiple<br>This version of the workbook is constructed to process multiple respondents' answers to the questions used to generate the Governance Capabilities.<br>The Multiple entry workbook has a second workbook that functions as the input tool for participants:<br>Prioritizing IT Governance Capabilities - User Form<br>This version of the workbook is the input device used | |

TABLE 12-continued

| Tool | Tool Description | What's Automated |
|---|---|---|
| | for capturing the questionnaire responses when there are multiple respondents. The results are copied and pasted into the Multiple tool for the generation of the charts and maturity level assessment. | |
| Time Tracking Tool | An excel based tool that automates the reconciliation of PeopleSoft Time and Labor data with the project schedule actual hours. | Automates the extract of Project Time & Labor data from PeopleSoft, the variance analysis and reporting |
| Portfolio Management Strategic Business Drivers Assessment | A key component of Portfolio Governance is its alignment with our customer's business and Information Technology (IT) strategy. The organization s is often asked or expected to participate in the development of these strategies, especially those related to IT.<br>Once a formal business and IT strategy has been developed, it should then be translated into a set of "strategic drivers" that will be used to assess the alignment of projects with the business and IT strategy.<br>After strategic business drivers are developed and confirmed, then a weighting should be applied to each of the drivers so that some drivers are weighted more highly than others. For instance, the customer may determine that increasing revenue is more important than reducing expenses, or vice versa.<br>One way to accomplish this is through a "Pairwise Comparison" activity where members of the customer's management team evaluate each driver against each of the other drivers and make a determination as to whether the driver being evaluated is more or less important than the driver against which it is being compared. This activity can generate discrete weightings for each driver through a mathematical process known as the "Analytic Hierarchy Process" which uses matrix operations to compute the weighting values. This can be done with a customized spreadsheet or it can be done through software designed to support this process such as Microsoft Office Project Portfolio Server.<br>Conducting a Pairwise Comparison of strategic drivers can be performed in several different ways. The most effective method is via a facilitated work session with the key senior executives in the customer organization who have responsibility for the corporate strategy. In this work session, the group collaboratively agrees on the relative importance of each strategic driver in relation to each other strategic driver.<br>Once a formal business and IT strategy has been developed, it should then be translated into a set of "strategic drivers" that will be used to assess the alignment of projects with the business and IT strategy.<br>This process can be performed without any formal tools, especially for smaller accounts or engagements. The output, a formal list of strategic business drivers with weights, can be documented in a spreadsheet. There are spreadsheet examples that can be referenced for performing this exercise manually. See section "1.8 Related Documents" on page 2.<br>At larger accounts or engagements, a more automated methodology may be required. For instance, Microsoft Project Portfolio Server provides a comprehensive solution for managing the weighting of strategic drivers as part of a comprehensive tool supported portfolio management process. | This tool automates and facilitates the "Pairwise Comparison" activity where members of the customer's management team evaluate each strategic business driver against each of the other drivers and make a determination as to whether the driver being evaluated is more or less important than the driver against which it is being compared. This activity can generate discrete weightings for each driver through a mathematical process known as the "Analytic Hierarchy Process" which uses matrix operations to compute the weighting values. |
| MS Project Professional and MS Project Server | Project Scheduling tools COTS | project scheduling, analysis and reporting functions |
| MS Portfolio Server | Project Portfolio Management application; COTS | project portfolio management, analysis and reporting functions |
| Resource Management Tools | This includes both the Capacity Management Template and components of PeopleSoft. | |
| New Project Request and Project Inventory Tools | These tools are the P1MO and P2MO solutions. Used by PMO to facilitate and manage receipt of customer new project requests; and a project inventory tool to manage the inventory of projects; small scale | new project request management; project inventory functions |

TABLE 12-continued

| Tool | Tool Description | What's Automated |
| --- | --- | --- |
| | solution versus a COTS Portfolio Management Package | |
| Procurement Management Tools | This includes a variety of excel based tools for Capital and Expense Recognition and tracking as well as Quote and Supplier tracking. | Capital and Expense Recognition and tracking as well as Quote and Supplier tracking. |
| Project Lifecycle Application (PLA) | | resource management; status reporting; project inventory; new project request; some portfolio management processes; P1MO or P2MO solution |

FIGS. 25-30 will now be described in conjunction with FIG. 2. FIGS. 25-30 illustrate various displays that may be presented to users of the clients 214(1), 214(2), and 214(3) on the asset-acquisition system 200. FIG. 25 is a display 2500 allowing the clients 214(1), 214(2), and 214(3) to navigate the knowledge repository 212 by knowledge area and project phase 2515, by SOP activities and project phase 2517, by asset topic 2519 (e.g., process and tool), or by a complete listing 2521.

Figure 29:
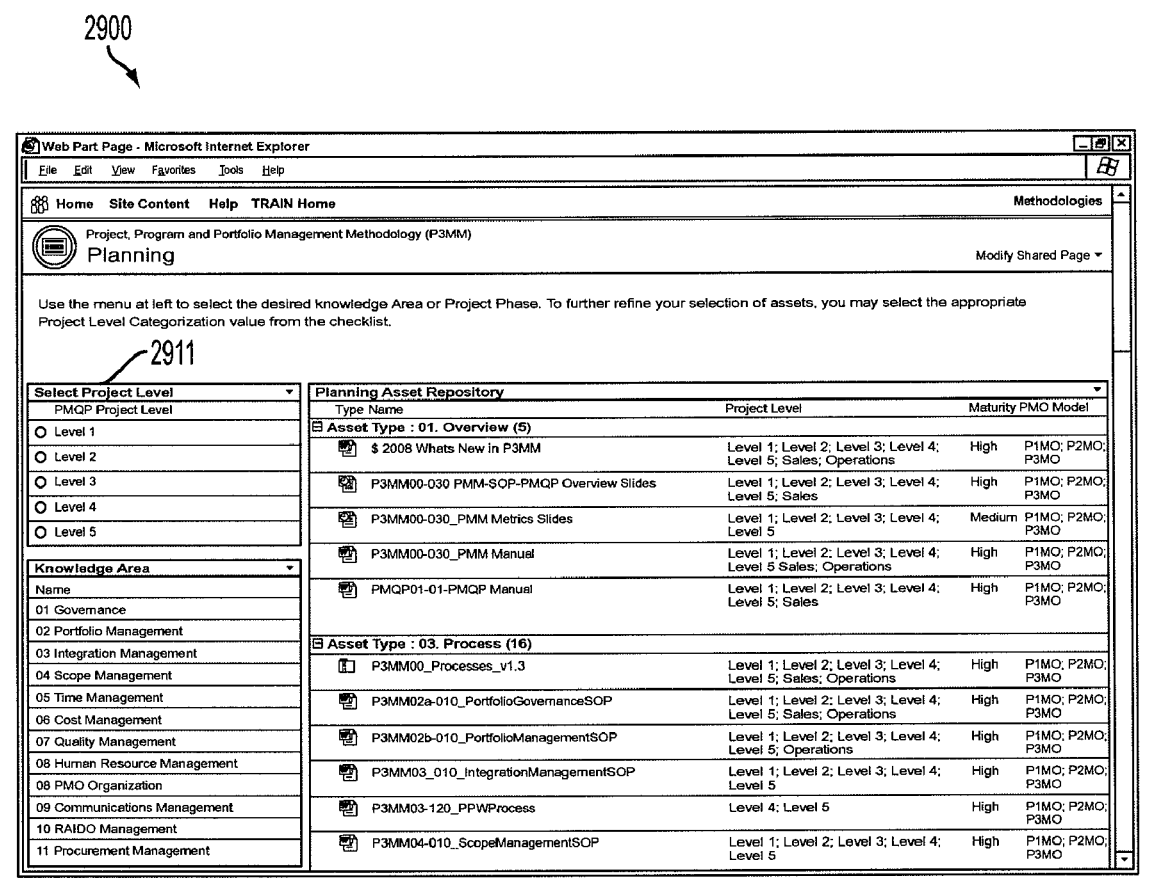

FIG. 26 is a display 2600 of a complete listing 2521 of, for example, all of the project-management assets 202 of FIG. 2. FIG. 27 is a display 2700 of, for example, the project-management assets 202 of FIG. 2 by the knowledge area and project phase 2515. FIG. 28 is a display 2800 of project-management assets for a time-management knowledge area, such as, for example, the time-management knowledge area 636 of FIG. 6B. In FIG. 28, a project-complexity filter 2811 is present to facilitate filtering of project-management assets by project level. FIG. 29 is a display 2900 of project-management assets for a planning knowledge area. The display 2900 additionally includes a project-complexity filter 2911 that is similar to the project-complexity filter 2811 of FIG. 28.

Figure 30:
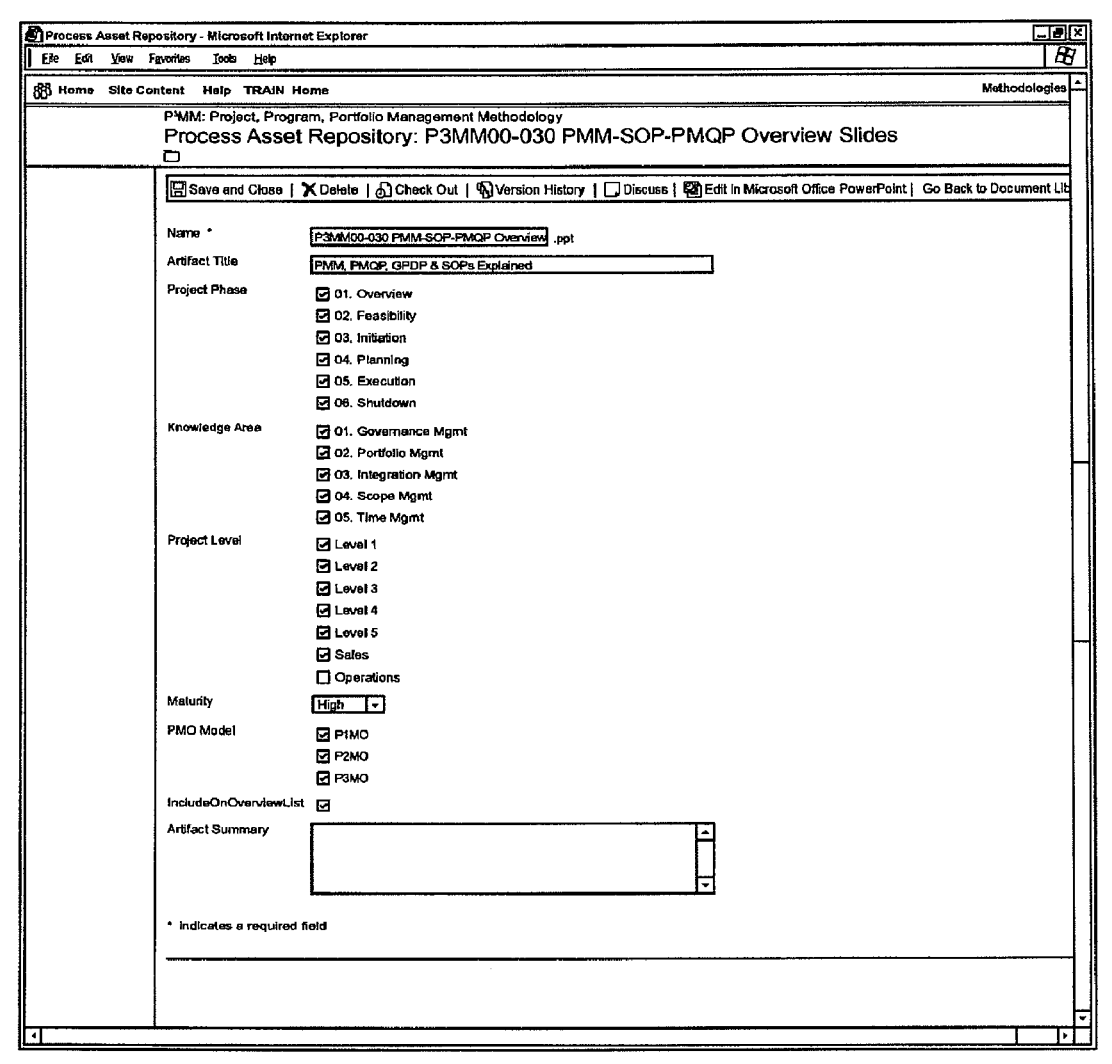

FIG. 30 is a check-box interface 3000 for displaying exemplary relationships for a project-management asset 3002. The check-box interface 3000 allows, for example, the clients 214(1), 214(2), and 214(3) of FIG. 2 to modify mappings between ones of the project-management assets 202 and various knowledge areas, SOP activities, project phases, and project-complexity levels. As shown, any changes to the project-management asset 3002 and its mappings will be stored in the knowledge repository 212.

Figure 31A:
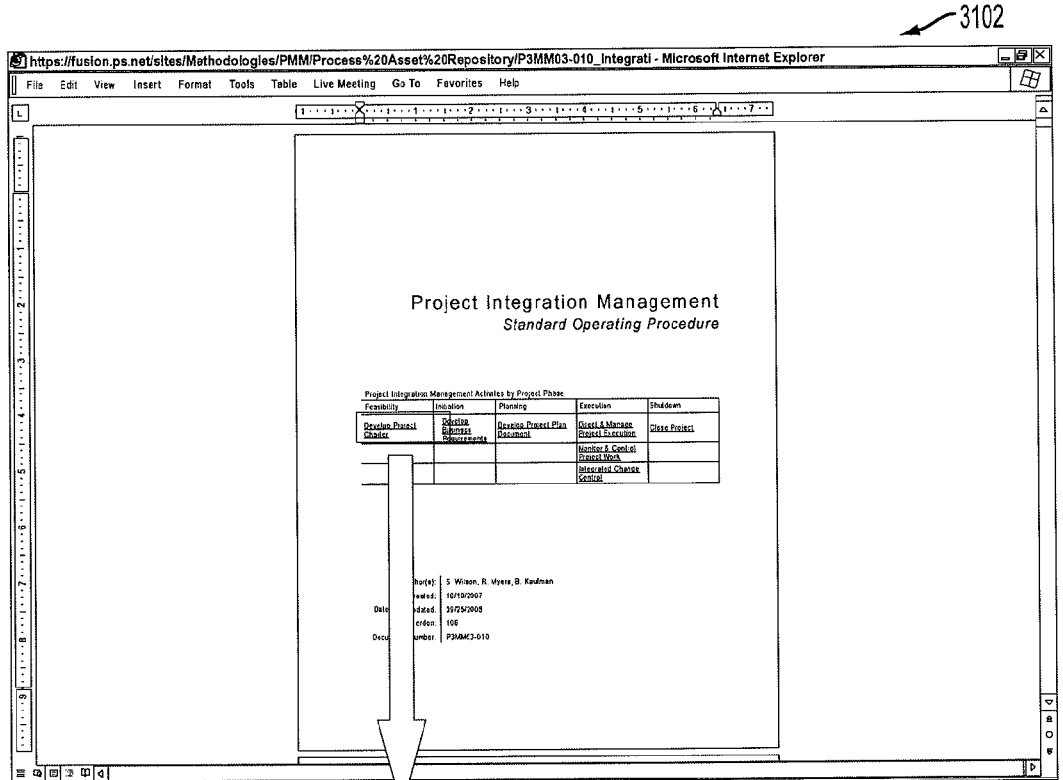
Figure 31B:
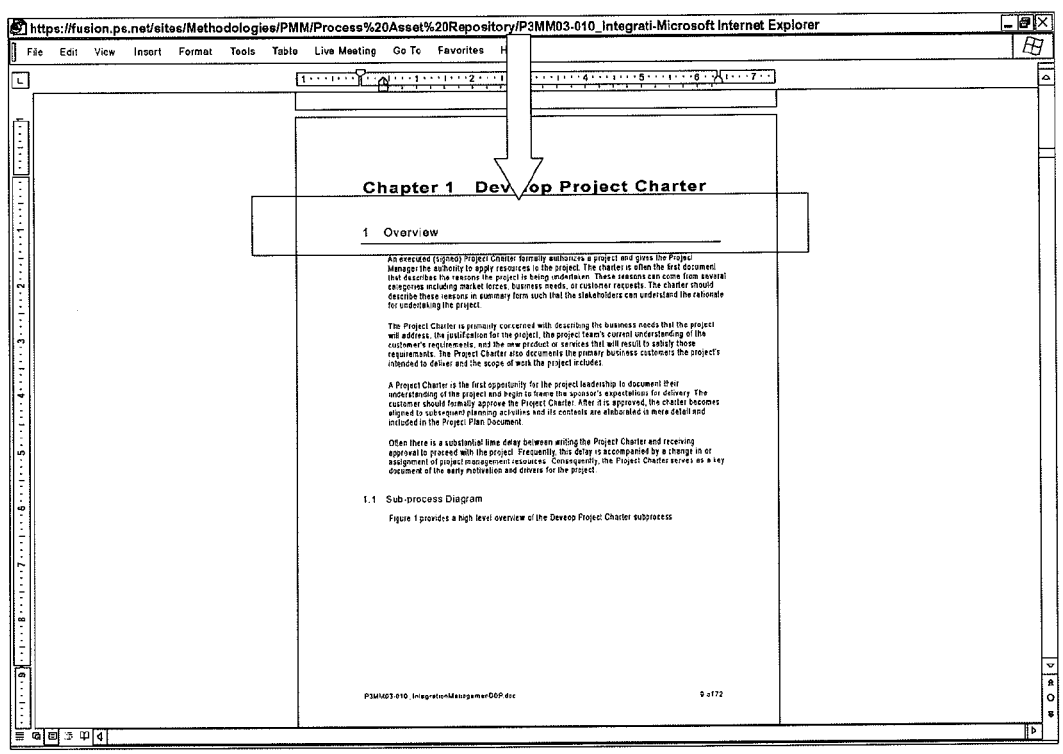
Figure 31C:
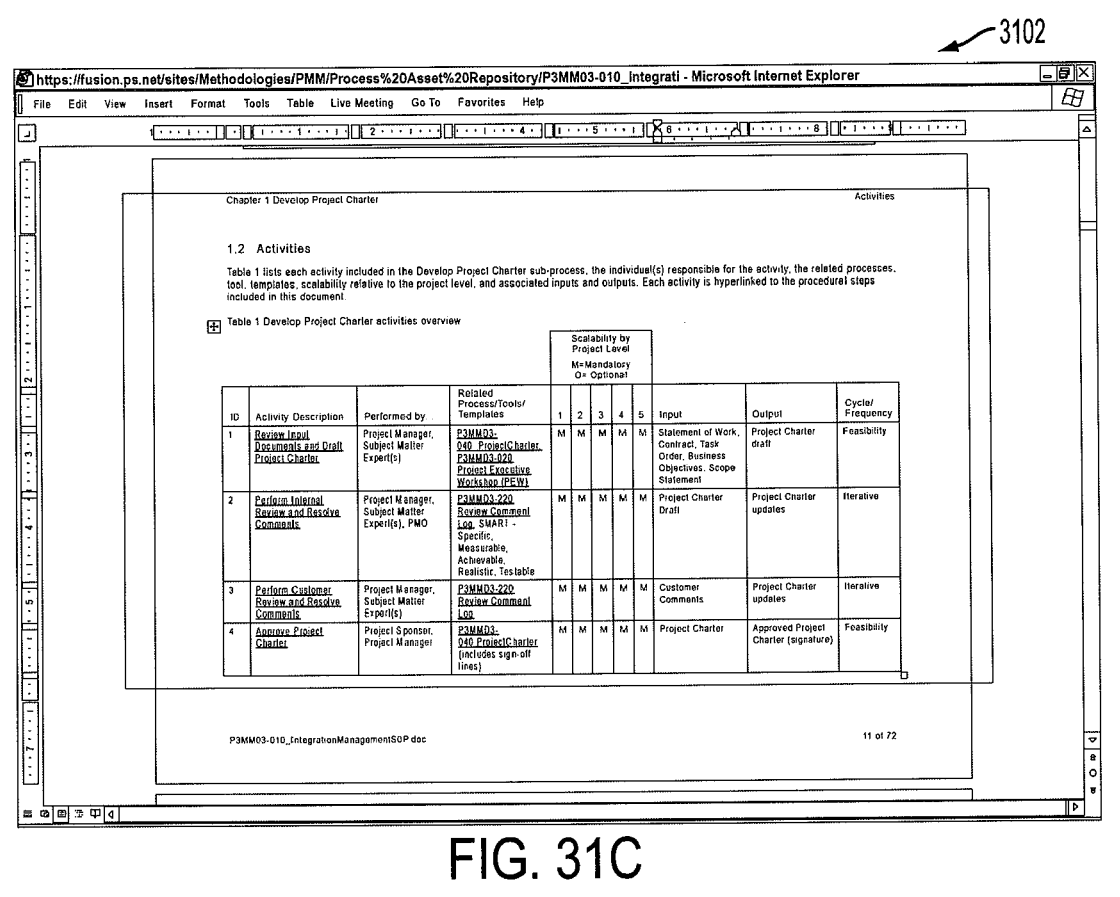

FIGS. 31A-C illustrate an exemplary project-management asset 3102. The exemplary project-management asset 3102 is a text document that may be used and downloaded by the clients 214(1), 214(2), and 214(3) of FIG. 2 to facilitate an SOP activity such as, for example, developing a project charter.

Figure 32:
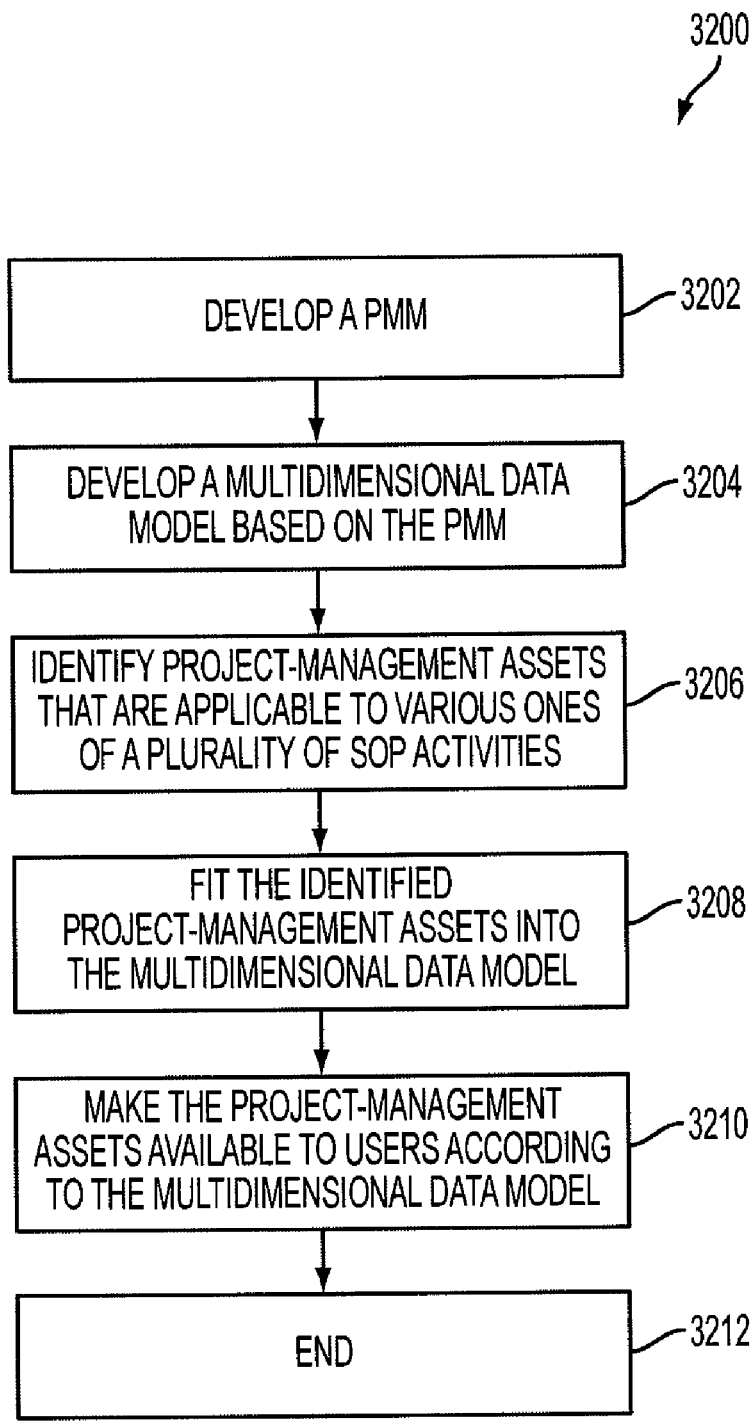
FIG. 32 illustrates a flowchart of an exemplary process.

FIG. 32 is a flow chart of a process 3200 for utilizing various embodiments of the invention. At step 3202, a PMM is developed. The PMM may be, for example, the PMM 123 of FIG. 1B. From step 3202, execution proceeds to step 3204. At step 3204, a multidimensional data model is implemented based on the PMM. The multidimensional data model may be, for example, the multidimensional PMM-based data model 696 of FIG. 6A or the scalable data model 696a of FIG. 6B. From step 3204, execution proceeds to step 3206. At step 3206, project-management assets are identified as particularly useful for ones of a plurality of SOP activities within the PMM. The project-management assets may be, for example, the project-management assets 102 of FIG. 1, the project-management assets 202 of FIG. 2, or the project-management assets 602 of FIG. 6A-6B. From step 3206, execution proceeds to step 3208. At step 3208, the project-management assets identified with the project-management assets in step 3206 are fit into the multidimensional data model developed implemented in step 3204. From step 3208, execution proceeds to step 3210. At step 3210, the project-management assets are made available to users using, for example, the asset-acquisition system 200 of FIG. 2. The process 3200 ends at step 3212.

Although various embodiments of the method of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A project-management method comprising:
   implementing, on a server computer having a processor and memory, a universal framework for engaging projects within an enterprise, the implementation comprising:
      specifying, in one or more computer-readable media accessible to the server computer, a project-management process operable to manage projects within the enterprise, the project-management process comprising a plurality of phases, each phase of the plurality of phases comprising a plurality of standard operating procedure (SOP) activities to be performed from at least one project-management level; and
      on the one or more computer-readable media, storing and integrating into the project-management process:
         a standardized set of process-related project-management assets, each project-management asset of the standardized set of process-related project-management assets being identified with at least one SOP activity of the project-management process, the standardized set of project-management assets in combination with the project-management process being deemed to increase at least one of project quality, project efficiency, and project effectiveness;
         a standardized set of project-management assets related to at least one of selecting, assigning, developing, certifying, and managing human resources involved in project management; and
         a standardized set of project-management assets comprising a plurality of technological tools, the plurality of technological tools being operable to automate one or more aspects of the project management process; and
   optimizing, via the server computer, at least one project via the integration of:
      the standardized set of process-related project-management assets;
      the standardized set of project-management assets related to at least one of selecting, assigning, developing, certifying, and managing human resources involved in project management; and the standardized set of project-management assets comprising the plurality of technological tools.

2. The project-management method of claim 1, wherein the at least one project-management level comprises a project level and the plurality of SOP activities comprises one or more SOP activities to be performed from the project level.

3. The project-management method of claim 2, wherein:
the at least one project-management level comprises a program level;
the plurality of SOP activities comprises one or more SOP activities to be performed from the program level; and
the optimizing action comprises optimization of at least one program of projects.

4. The project-management method of claim 3, wherein:
the at least one project-management level comprises a portfolio level;
the plurality of SOP activities comprises one or more SOP activities to be performed from the portfolio level; and
the optimizing action comprises optimization of at least one portfolio of projects.

5. The project-management method of claim 4, wherein the implementation comprises generating and storing a defined set of metrics for the projects in the enterprise and a defined set of thresholds, each threshold in the defined set of thresholds being related to a metric in the defined set of metrics.

6. The project-management method of claim 5, the project-management method comprising monitoring a project in the enterprise from at least one of the project level, the program level, and the portfolio level via the defined set of metrics.

7. The project-management method of claim 6, wherein the monitoring action comprises generating a standardized project scorecard for the project that includes a value for each metric in the defined set of metrics.

8. The project-management method of claim 7, wherein the monitoring action comprises, for each threshold in the defined set of thresholds, comparing the threshold to the related metric in the defined set of metrics.

9. The project-management method of claim 8, wherein:
the monitoring action comprises monitoring a plurality of projects in the enterprise using the defined set of metrics; and
the generation of the standardized project scorecard comprises generation of the standardized project scorecard for each of the plurality of projects.

10. The project-management method of claim 9, the project-management method comprising identifying an underperforming project from the plurality of projects via a comparison of the project scorecard for each of the plurality of projects.

11. The project-management method of claim 10, the project-management method comprising associating each metric in the defined set of metrics with at least selected ones of the plurality of SOP activities of the project-management process in the memory of the server computer.

12. The project-management method of claim 11, wherein the monitoring action comprises monitoring performance of the at least selected ones of the plurality of SOP activities for the plurality of projects via the association of each metric in the defined set of metrics therewith.

13. The project-management method of claim 12, wherein:
the plurality of projects is a program of projects; and
the monitoring action comprises monitoring at least a portion of the one or more SOP activities to be performed from the program level.

14. The project-management method of claim 12, wherein:
the plurality of projects is a portfolio of projects; and
the monitoring action comprises monitoring at least a portion of the one or more SOP activities to be performed from the portfolio level.

15. The project-management method of claim 14, the project-management method comprising defining a plurality of project-management roles, at least one role of the plurality of project-management roles relating to the project level, at least one role of the plurality of project-management roles relating to the program level, and at least one role of the project-management roles relating to the portfolio level.

16. The project-management method of claim 15, the project-management method comprising:
mapping at least one of the one or more SOP activities to be performed from the project level to the at least one role relating to the project level, the at least one activity being included in the at least a portion of the one or more SOP activities being monitored from the project level;
mapping at least one of the one or more SOP activities to be performed from the program level to the at least one role relating to the program level, the at least one activity being included in the at least a portion of the one or more SOP activities being monitored from the program level; and
mapping at least one of the one or more SOP activities to be performed from the portfolio level to the at least one role relating to the portfolio level, the at least one activity being included in the at least a portion of the one or more SOP activities being monitored from the portfolio level.

17. The project-management method of claim 16, the project-management method comprising:
reporting at least one metric to a human resource assigned to the at least one role relating to the project level;
reporting at least one metric to a human resource assigned to the at least one role relating to the program level; and
reporting at least one metric to a human resource assigned to the at least one role relating to the portfolio level.

18. The project-management method of claim 17, the project-management method comprising wherein the human resource assigned to the at least one role relating to the project level, the human resource assigned to the at least one role relating to the program level, and the human resource assigned to the at least one role relating to the portfolio level are at least one of selected, assigned, developed, and certified via the standardized set of project-management assets related to at least one of selecting, assigning, developing, certifying, and managing human resources involved in project management.

19. The project-management method of claim 17, wherein the monitoring action is at least partially automated via selected ones of the plurality of technological tools.

20. The project-management method of claim 5, wherein the defined set of metrics comprises metrics relating to at least one of project scope, project schedule, project cost, project resources, project risk, and project quality.

21. The computer-program product of claim 7, wherein the monitoring action comprises, for each threshold in the defined set of thresholds, comparing the threshold to the related metric in the defined set of metrics.

22. The computer-program product of claim 21, wherein:
the monitoring action comprises monitoring a plurality of projects in the enterprise using the defined set of metrics; and
the generation of the standardized project scorecard comprises generation of the standardized project scorecard for each of the plurality of projects.

23. The computer-program product of claim 22, the project-management method comprising identifying an underperforming project from the plurality of projects via a comparison of the project scorecard for each of the plurality of projects.

24. The computer-program product of claim 23, the project-management method comprising associating each metric in the defined set of metrics with at least selected ones of the plurality of SOP activities of the project-management process in the memory of the server computer.

25. The computer-program product of claim 24, wherein the monitoring action comprises monitoring performance of the at least selected ones of the plurality of SOP activities for the plurality of projects via the association of each metric in the defined set of metrics therewith.

26. The computer-program product of claim 25, wherein:
the plurality of projects is a portfolio of projects; and
the monitoring action comprises monitoring at least a portion of the one or more SOP activities to be performed from the portfolio level.

27. The computer-program product of claim 26, the project-management method comprising defining a plurality of project-management roles, at least one role of the plurality of project-management roles relating to the project level, at least one role of the plurality of project-management roles relating to the program level, and at least one role of the project-management roles relating to the portfolio level.

28. The computer-program product of claim 27, the project-management method comprising:
mapping at least one of the one or more SOP activities to be performed from the project level to the at least one role relating to the project level, the at least one activity being included in the at least a portion of the one or more SOP activities being monitored from the project level;
mapping at least one of the one or more SOP activities to be performed from the program level to the at least one role relating to the program level, the at least one activity being included in the at least a portion of the one or more SOP activities being monitored from the program level; and
mapping at least one of the one or more SOP activities to be performed from the portfolio level to the at least one role relating to the portfolio level, the at least one activity being included in the at least a portion of the one or more SOP activities being monitored from the portfolio level.

29. The computer-program product of claim 28, the project-management method comprising:
reporting at least one metric to a human resource assigned to the at least one role relating to the project level;
reporting at least one metric to a human resource assigned to the at least one role relating to the program level; and
reporting at least one metric to a human resource assigned to the at least one role relating to the portfolio level.

30. The computer-program product of claim 29, the project-management method comprising wherein the human resource assigned to the at least one role relating to the project level, the human resource assigned to the at least one role relating to the program level, and the human resource assigned to the at least one role relating to the portfolio level are at least one of selected, assigned, developed, and certified via the standardized set of project-management assets related to at least one of selecting, assigning, developing, certifying, and managing human resources involved in project management.

31. The computer-program product of claim 29, wherein the monitoring action is at least partially automated via selected ones of the plurality of technological tools.

32. The computer-program product of claim 25, wherein:
the plurality of projects is a program of projects; and
the monitoring action comprises monitoring at least a portion of the one or more SOP activities to be performed from the program level.

33. A computer-program product comprising a computer-usable medium having computer-readable program code embodied therein, the computer-readable program code adapted to be executed to implement a project-management method comprising:
implementing, on a server computer having a processor and memory, a universal framework for engaging projects within an enterprise, the implementation comprising:
specifying, in one or more computer-readable media accessible to the server computer, a project-management process operable to manage projects within the enterprise, the project-management process comprising a plurality of phases, each phase of the plurality of phases comprising a plurality of standard operating procedure (SOP) activities to be performed from at least one project-management level;
on the one or more computer-readable media, storing and integrating into the project-management process:
a standardized set of process-related project-management assets, each project-management asset of the standardized set of process-related project-management assets being identified with at least one SOP activity of the project-management process, the standardized set of project-management assets in combination with the project-management process being deemed to increase at least one of project quality, project efficiency, and project effectiveness;
a standardized set of project-management assets related to at least one of selecting, assigning, developing, certifying, and managing human resources involved in project management; and
a standardized set of project-management assets comprising a plurality of technological tools, the plurality of technological tools being operable to automate one or more aspects of the project management process; and
optimizing, via the server computer, at least one project via the integration of:
the standardized set of process-related project-management assets;
the standardized set of project-management assets related to at least one of selecting, assigning, developing, certifying, and managing human resources involved in project management; and
the standardized set of project-management assets comprising the plurality of technological tools.

34. The computer-program product of claim 33, wherein the at least one project-management level comprises a project level and the plurality of SOP activities comprises one or more SOP activities to be performed from the project level.

35. The computer-program product of claim 34, wherein:
the at least one project-management level comprises a program level;
the plurality of SOP activities comprises one or more SOP activities to be performed from the program level; and
the optimizing action comprises optimization of at least one program of projects.

36. The computer-program product of claim 35, wherein:
the at least one project-management level comprises a portfolio level;

the plurality of SOP activities comprises one or more SOP activities to be performed from the portfolio level; and the optimizing action comprises optimization of at least one portfolio of projects.

37. The computer-program product of claim 36, wherein the implementation comprises generating and storing a defined set of metrics for the projects in the enterprise and a defined set of thresholds, each threshold in the defined set of thresholds being related to a metric in the defined set of metrics.

38. The computer-program product of claim 37, the project-management method comprising monitoring a project in the enterprise from at least one of the project level, the program level, and the portfolio level via the defined set of metrics.

39. The computer-program product of claim 38, wherein the monitoring action comprises generating a standardized project scorecard for the project that includes a value for each metric in the defined set of metrics.

40. The computer-program product of claim 37, wherein the defined set of metrics comprises metrics relating to at least one of project scope, project schedule, project cost, project resources, project risk, and project quality.

* * * * *